(12) United States Patent
Okamoto et al.

(10) Patent No.: US 11,874,210 B2
(45) Date of Patent: Jan. 16, 2024

(54) SAMPLE ANALYSIS SUBSTRATE

(71) Applicant: PHC HOLDINGS CORPORATION, Tokyo (JP)

(72) Inventors: Fusatoshi Okamoto, Ehime (JP); Kazuya Kondoh, Ehime (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 426 days.

(21) Appl. No.: 17/294,236

(22) PCT Filed: Nov. 14, 2019

(86) PCT No.: PCT/JP2019/044728
§ 371 (c)(1),
(2) Date: May 14, 2021

(87) PCT Pub. No.: WO2020/100987
PCT Pub. Date: May 22, 2020

(65) Prior Publication Data
US 2022/0003643 A1 Jan. 6, 2022

(30) Foreign Application Priority Data

Nov. 16, 2018 (JP) .................................. 2018-215329

(51) Int. Cl.
*G01N 1/36* (2006.01)
*G01N 35/08* (2006.01)

(52) U.S. Cl.
CPC ............... *G01N 1/36* (2013.01); *G01N 35/08* (2013.01); *G01N 2001/368* (2013.01)

(58) Field of Classification Search
None
See application file for complete search history.

(56) References Cited

U.S. PATENT DOCUMENTS

2006/0073075 A1* 4/2006 Nagaoka ........... B01F 35/71725
422/64
2010/0240142 A1* 9/2010 Saiki ..................... G01N 21/07
436/164

(Continued)

FOREIGN PATENT DOCUMENTS

JP 2009-186247 A 8/2009

OTHER PUBLICATIONS

International Search Report and Written Opinion issued in International Patent Application No. PCT/JP2019/044728, dated Feb. 4, 2020; with partial English translation.

(Continued)

*Primary Examiner* — Brandi N Hopkins
*Assistant Examiner* — Nigel H Plumb
(74) *Attorney, Agent, or Firm* — Rimon P.C.

(57) ABSTRACT

A sample analysis substrate capable of holding a plurality of liquids. The sample analysis substrate has a microchannel structure for transferring a liquid through rotary motion, the sample analysis substrate including: a substrate body having a rotation axis; a first and a second container holding a first and a second liquid therein; a first and a second accommodating section accommodating the first and the second container; and a cap having a first and second projection and movably supported on the substrate body. As the cap moves, the first drive projection and the second drive projection move the first container and the second container with staggered timing, thereby releasing the first and the second liquid accommodated therein.

5 Claims, 24 Drawing Sheets

(56) References Cited

U.S. PATENT DOCUMENTS

| | | | | |
|---|---|---|---|---|
| 2010/0281961 A1* | 11/2010 | Saiki | ...................... | G01N 21/07 |
| | | | | 73/64.56 |
| 2011/0126646 A1* | 6/2011 | Saiki | ................... | B01F 33/3017 |
| | | | | 73/864.81 |

OTHER PUBLICATIONS

The Extended European Search Report dated Dec. 13, 2021 issued in the corresponding European Patent Application No. 19884920.0.

\* cited by examiner

SAMPLE ANALYSIS SUBSTRATE

CROSS-REFERENCE OF RELATED APPLICATIONS

This application is the U.S. National Phase under 35 U.S.C. § 371 of International Patent Application No. PCT/JP2019/044728, filed on Nov. 14, 2019, which in turn claims the benefit of Japanese Application No. 2018-215329, filed on Nov. 16, 2018, the entire disclosures of which Applications are incorporated by reference herein.

TECHNICAL FIELD

The present application relates to a sample analysis substrate.

BACKGROUND ART

Methods have been known in the art for analyzing a liquid collected from a living thing, or the like, by using a sample analysis substrate having liquid channels formed therein. A sample analysis substrate is capable of controlling a fluid by using a rotating device. For example, Patent Document No. 1 discloses a technique in which a disc-shaped sample analysis substrate having channels/chambers, etc., formed therein is used, and the sample analysis substrate is rotated, etc., for transfer, distribution and mixing of a solution, analysis of a particular component in a specimen solution, etc. This sample analysis substrate includes a diluent container for holding a diluent to be used in analysis.

CITATION LIST

Patent Literature

Patent Document No. 1: Japanese Laid-Open Patent Publication No. 2009-186247

SUMMARY OF INVENTION

Technical Problem

In some cases, it is necessary to provide a plurality of liquids for the analysis of a particular component for increasing the detection accuracy for the particular component in the specimen, for using a complicated reaction in the detection or quantitative determination of the particular component, and for other reasons. A non-limiting illustrative embodiment of the present application provides a sample analysis substrate capable of holding a plurality of liquids.

Solution to Problem

A sample analysis substrate according to one embodiment of the present application is sample analysis substrate having a microchannel structure for transferring a liquid through rotary motion, including: a substrate body having a rotation axis; a first container having a first contact surface and holding a first liquid therein; a second container having a second contact surface and holding a second liquid therein; a first accommodating section located in the substrate body and accommodating the first container in such a manner that the first container is movable between a first holding position in which the first container is held and a first release position in which the first liquid can be released from the first container; a second accommodating section located in the substrate body and accommodating the second container in such a manner that the second container is movable between a second holding position in which the second container is held and a second release position in which the second liquid can be released from the second container; and a cap having a first drive projection and a second drive projection and movably supported on the substrate body, wherein as the cap moves, the first drive projection and the second drive projection come into contact with the first contact surface and the second contact surface, respectively, thereby moving the first container and the second container from the first holding position and the second holding position to the first release position and the second release position, wherein the cap is capable of taking: a first position where the first container and the second container are in the first holding position and the second holding position, respectively, in which only the first drive projection is in contact with the first contact surface; a second position where the first container is located between the first holding position and the first release position and the second container is in the second holding position, in which the first drive projection and the second drive projection are in contact with the first contact surface and the second contact surface; and a third position where the first container and the second container are in the first release position and the second release position, respectively, in which the first drive projection and the second drive projection are in contact with the first contact surface and the second contact surface, respectively.

Advantageous Effects of Invention

The present disclosure provides a sample analysis substrate capable of holding a plurality of liquids.

DESCRIPTION OF EMBODIMENTS

An analysis method for analyzing a component of a sample such as urine or blood may use the binding reaction between an analyte, which is the object of analysis, and a ligand that specifically binds to the analyte. Such analysis methods include immunoassay methods and genetic diagnosis methods, for example. In the present application, urine, blood, etc., will be referred to as a specimen.

An example of an immunoassay method is a competition method and a non-competition method (sandwich immunoassay method). An example of a genetic diagnosis method is a gene detection method by hybridization. These immunoassay methods and gene detection methods use magnetic particles (which may be referred to as "magnetized beads", "magnetic particles", "magnetic beads", etc.), for example. As an example of these analysis methods, a sandwich immunoassay method using magnetic particles will be described in detail.

Figure 1:
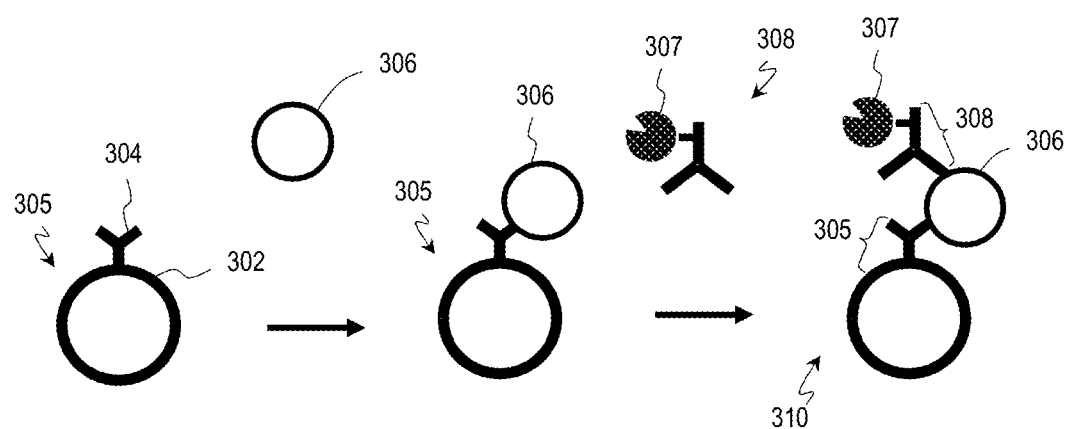
FIG. 1 is an example schematic view illustrating a sandwich immunoassay method using a magnetic particle.

As shown in FIG. 1, first, a primary antibody 304 (hereinafter referred to as a "magnetic particle immobilized antibody 305"), which is immobilized on the surface of a magnetic particle 302, and an antigen 306 included in the sample, which is the object of measurement, are bound together by an antigen-antibody reaction. Next, a secondary antibody to which a label substance 307 is bound (hereinafter referred to as a "labeled antibody 308") and the antigen 306 are bound together by an antigen-antibody reaction. Thus, a complex 310 is obtained, in which the magnetic particle immobilized antibody 305 and the labeled antibody 308 are bound to the antigen 306.

A signal based on the label substance 307 of the labeled antibody 308 bound to the complex 310 is detected, and the antigen concentration is measured in accordance with the amount of signal detected. Examples of the label substance 307 include, for example, enzymes (e.g., peroxidase, alkaline phosphatase, luciferase, etc.), chemiluminescent substances, electrochemiluminescent substances, fluorescent substances, and the like, and signals of dye, luminescence, fluorescence, etc., that correspond to the label substance 307 are detected. For example, a substrate is used, whose emission or absorption spectrum changes upon reacting with the label substance 307.

In this series of reactions, in order to obtain the complex 310, which is the reacted substance, it is necessary to separate it from unreacted substances in the specimen, substances that are non-specifically adsorbed to magnetic particles, etc., and unreacted substances such as the labeled antibody 308 that were not involved in the formation of the complex 310. This separation is called B/F separation (Bound/Free Separation). Similarly, also with an immunoassay method by a competition method or a gene detection method by hybridization, a B/F separation step is necessary. For example, cases where no magnetic particles are used include use of a ligand immobilized on a solid phase made of a material such as polystyrene or polycarbonate by physical adsorption, a ligand immobilized on a solid phase by chemical bonding, and a ligand immobilized (e.g., using a self-assembled monolayer (SAM)) on the surface of a metal substrate made of gold, etc.

In order to achieve sufficient B/F separation, it is preferred to wash magnetic particles including the complex 310 multiple times with a washing solution. Specifically, first, in a reaction solution containing the complex 310 and the unreacted antigen 306, the labeled antibody 308, etc., only the reaction solution is removed while the complex 310 containing magnetic particles is captured by a magnet. Thereafter, a washing solution is added to wash the complex 310, and the washing solution is removed. By repeating this washing multiple times, it is possible to achieve B/F separation in which unreacted substances and non-specifically adsorbed substances are sufficiently removed.

Therefore, when detecting a particular component in the specimen by utilizing the analysis method described above using the sample analysis substrate, it is necessary to use a substrate solution and a washing solution, for example. The sample analysis substrate of the present disclosure is capable of holding two liquids beforehand. The sample analysis substrate and the sample analyzer of the present disclosure will be outlined below.

[Item 1] A sample analysis substrate having a microchannel structure for transferring a liquid through rotary motion, including:

a substrate body having a rotation axis;

a first container having a first contact surface and holding a first liquid therein;

a second container having a second contact surface and holding a second liquid therein;

a first accommodating section located in the substrate body and accommodating the first container in such a manner that the first container is movable between a first holding position in which the first container is held and a first release position in which the first liquid can be released from the first container;

a second accommodating section located in the substrate body and accommodating the second container in such a manner that the second container is movable between a second holding position in which the second container is held and a second release position in which the second liquid can be released from the second container; and a cap having a first drive projection and a second drive projection and movably supported on the substrate body, wherein as the cap moves, the first drive projection and the second drive projection come into contact with the first contact surface and the second contact surface, respectively, thereby moving the first container and the second container from the first holding position and the second holding position to the first release position and the second release position, wherein the cap is capable of taking:

a first position where the first container and the second container are in the first holding position and the second holding position, respectively, in which only the first drive projection is in contact with the first contact surface;

a second position where the first container is located between the first holding position and the first release position and the second container is in the second holding position, in which the first drive projection and the second drive projection are in contact with the first contact surface and the second contact surface; and a third position where the first container and the second container are in the first release position and the second release position, respectively, in which the first drive projection and the second drive projection are in contact with the first contact surface and the second contact surface, respectively.

[Item 2] The sample analysis substrate according to item 1, wherein:

each of the first container and the second container holds the first liquid or the second liquid, and includes a space having an opening and a sealing membrane covering the opening;

each of the first accommodating section and the second accommodating section includes a space accommodating the first container or the second container and a seal-breaking nail protruding into the space; and the seal-breaking nail does not penetrate through the sealing membrane when the first container and the second container are in the first holding position and the second holding position, and the seal-breaking nail penetrates through the sealing membrane when the first container and the second container are at least in the first release position and the second release position.

[Item 3] The sample analysis substrate according to item 1 or 2, wherein:

the first container includes a first pusher portion having the first contact surface, and the first pusher portion has an elastically deformable flange portion that is located around the second contact surface and in engagement with a portion of the substrate body; and the second container includes a second pusher portion having the second contact surface, and the second pusher portion has an elastically deformable flange portion that is located around the second contact surface and in engagement with a portion of the substrate body.

[Item 4] The sample analysis substrate according to item 3, wherein:

the first accommodating section and the second accommodating section are located in the vicinity of a rotation axis of the substrate body;

when the first container and the second container are in the first holding position and the second holding position, respectively, the first contact surface and the second contact surface are located on a first plane that is perpendicular to a direction of movement of the first container and the second container;

the cap is pivotally attached to the substrate body about a pivot axis that is located on a radially outer side relative to the first accommodating section and the second accommodating section and on a radially outer side relative to the first plane;

a distance between the pivot axis and a tip of the second drive projection is longer than a distance between the pivot axis and a tip of the first drive projection; and when the cap is in the third position, the tip of the first drive projection and the tip of the second drive projection are located on a second plane that is parallel to the first plane.

[Item 5] The sample analysis substrate according to any one of items 1 to 4, further including:

a first holding chamber for holding the first liquid, wherein the first holding chamber is located on a radially outer side relative to the first accommodating section in the substrate body;

a passage that connects together the first holding chamber and the first accommodating section;

a second holding chamber for holding the second liquid, wherein the second holding chamber is located on a radially outer side relative to the second accommodating section in the substrate body; and a passage that connects together the second holding chamber and the second accommodating section.

Figure 2A:
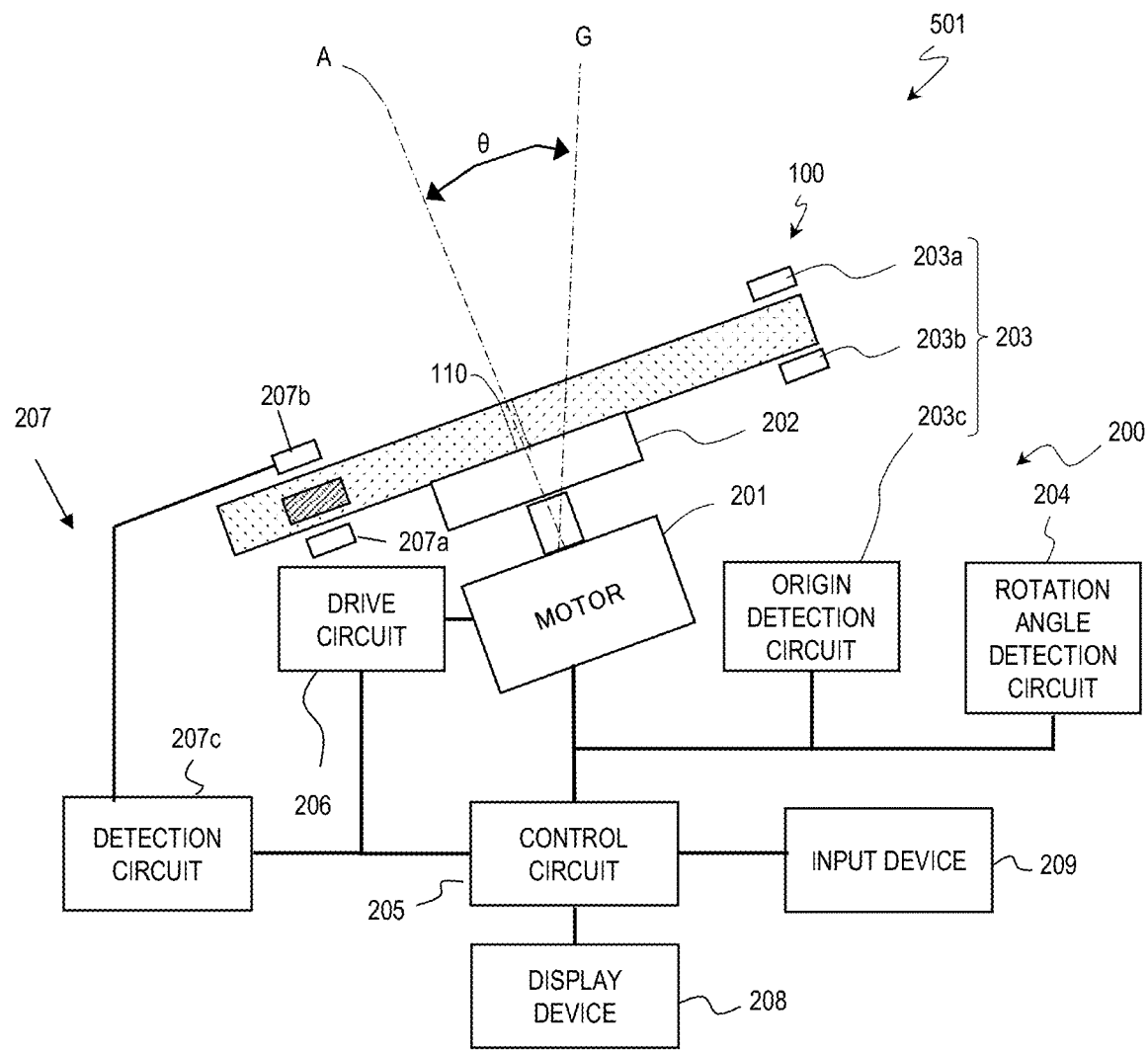
FIG. 2A is a block diagram showing a general configuration of a sample analysis system.
Figure 2B:
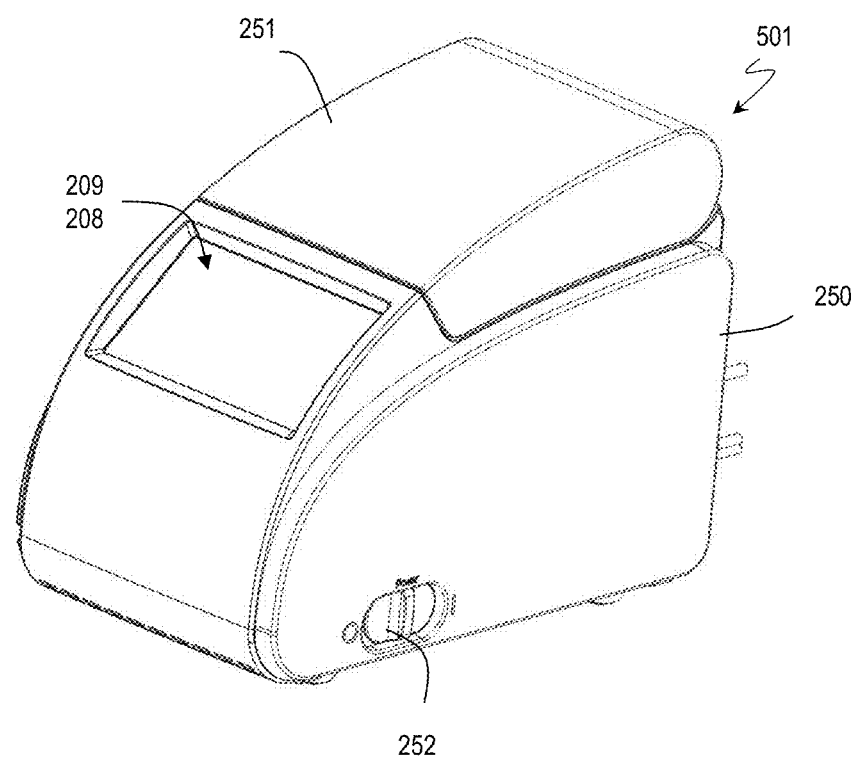
FIG. 2B is a perspective view of a sample analyzer.
Figure 2C:
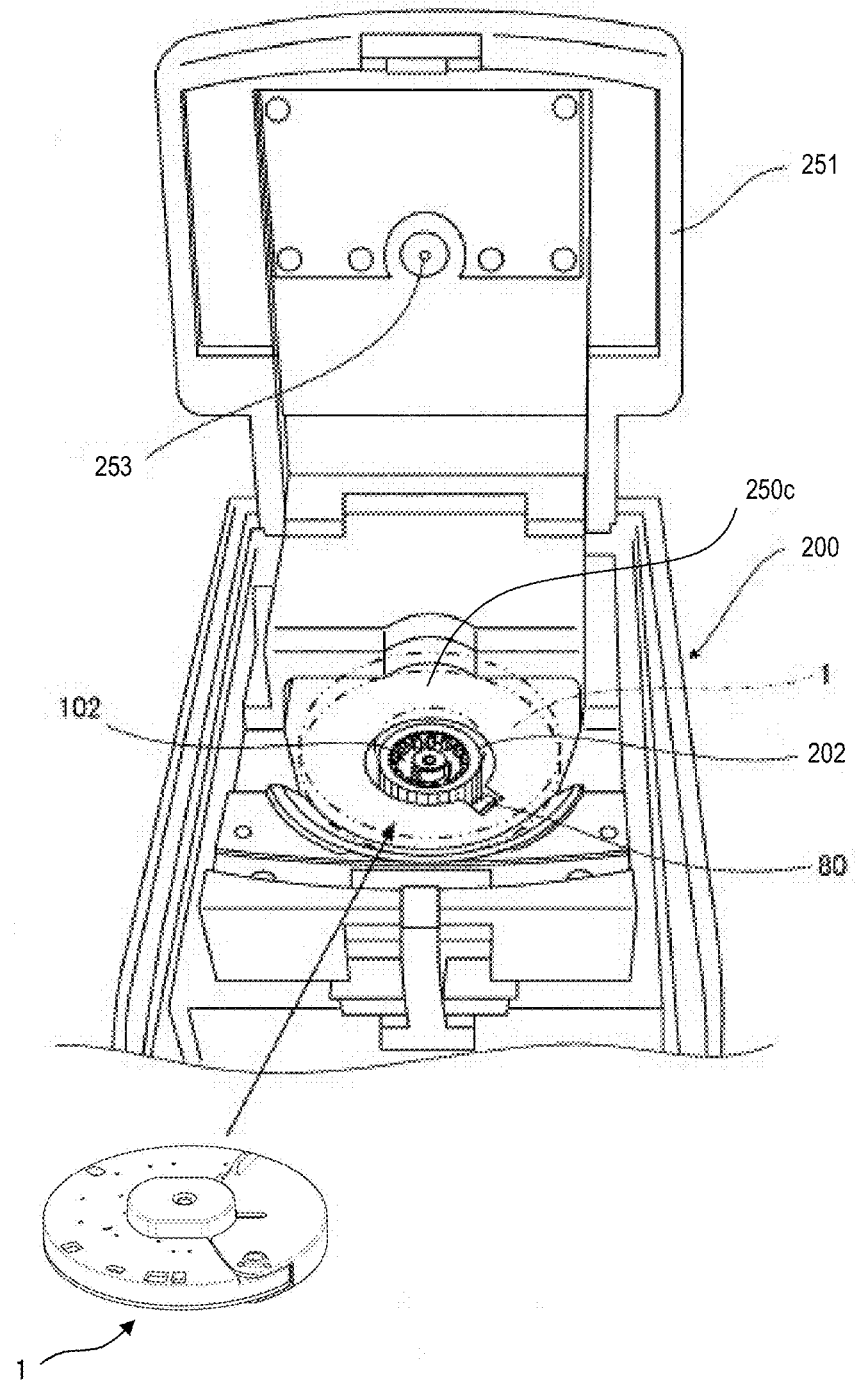
FIG. 2C is a perspective view of the sample analyzer with the door open.

A sample analysis substrate, a sample analyzer, a sample analysis system and a method for controlling a sample analyzer of the present embodiment will now be described in detail with reference to the drawings. FIG. 2A is a block diagram showing the general configuration of a sample analysis system 501, and FIG. 2B is a perspective view showing an example of the external appearance of a sample analyzer 200. FIG. 2C is a perspective view showing the sample analyzer 200 with the door open. The sample analysis system 501 includes the sample analyzer 200 and a sample analysis substrate 1.

The sample analyzer 200 includes a casing 250 that has a door 251 that can be opened/closed. The casing 250 has a housing 250c for rotatably housing the sample analysis substrate 1, and a motor 201 having a turntable 202 is arranged in the housing 250c. With the door 251 open, the sample analysis substrate 1 can be attached/removed to/from the turntable 202 in the housing 250c. As the door 251 is closed, the door 251 shades the housing 250c so as to prevent light from entering the housing 250c from outside. The sample analysis substrate 1 is sandwiched between the clamper 253 provided on the door 251 and the turntable 202. The casing 250 is provided with a power switch 252 for starting/shutting down the sample analyzer 200, and a display device 208. The display device 208 may be a touch panel that functions also as an input device 209.

The sample analyzer 200 includes the motor 201, a control circuit 205, a drive circuit 206 and an optical measurement unit 207.

The motor 201 has a rotation axis A that is inclined by an angle θ greater than 0° and 90° or less relative to the gravity direction G, and rotates the sample analysis substrate 1 mounted on the turntable 202 about the rotation axis A. With the inclination of the rotation axis A, movement due to gravity, as well as centrifugal force from rotation, can be used for transferring a liquid in the sample analysis substrate 1. The inclination angle of the rotation axis A relative to the gravity direction G is preferably 5° or more, more preferably 10° or more and 45° or less, and even more preferably 20° or more and 30° or less. The motor 201 may be a DC motor, a brushless motor, an ultrasonic motor, or the like, for example.

The drive circuit 206 rotates the motor 201. Specifically, based on a command from the control circuit 205, the sample analysis substrate 1 is rotated clockwise or counterclockwise. Alternatively, the sample analysis substrate 1 is shaken by being reciprocated left and right with a predetermined amplitude range and period about the rotation axis A at a predetermined stationary position.

A rotation angle detection circuit 204 detects the rotation angle of the motor 201 about the rotation axis A. For example, the rotation angle detection circuit 204 may be a rotary encoder attached to the rotation axis A. Where the motor 201 is a brushless motor, the rotation angle detection circuit 204 may include a Hall element provided in the brushless motor, and a detection circuit that receives an output signal from the Hall element to output the rotation angle about the rotation axis A. The control circuit 205 to be described below may function also as the detection circuit. Where the attachment angle of the sample analysis substrate 1 is predetermined relative to the turntable 202, the rotation angle about the rotation axis A coincides with the rotation angle of the sample analysis substrate 1.

Figure 2D:
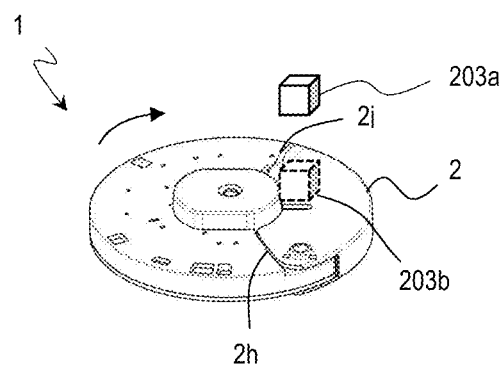
FIG. 2D is a schematic view illustrating a method for detecting the origin of the sample analysis substrate in the sample analyzer.

The configuration may be such that the sample analysis substrate 1 is attached at an arbitrary angle relative to the turntable 202. In such a case, the rotation angle of a reference portion of the sample analysis substrate 1 attached to the turntable 202 is detected. The reference portion of the sample analysis substrate 1 will hereinafter be referred to as the origin. Therefore, the sample analyzer 200 may include an origin detector 203. For example, as shown in FIG. 2D, the origin detector 203 includes a light source 203a, a light-receiving element 203b and an origin detection circuit 203c, and is arranged so that the sample analysis substrate 1 is located between the light source 203a and the light-receiving element 203b. For example, the light source 203a is a light-emitting diode, and the light-receiving element 203b is a photodiode. As will be described below, the sample analysis substrate 1 has a cap 2 that has a light-blocking property. For example, the cap 2 has a light-blocking property such that at least a portion of light emitted from the light source 203a is blocked. In the sample analysis substrate 1, the area of the cap 2 has a small transmittance (e.g., 10% or less), and the area other than the cap 2 has a large transmittance (e.g., 60% or more).

As the sample analysis substrate 1 is rotated by the motor 201, the light-receiving element 203b outputs to the origin detection circuit 203c a detection signal that corresponds to the amount of light of the incident light. Depending on the rotation direction, the detection signal increases or decreases at the edge 2h or the edge 2j of the cap 2. For example, where the sample analysis substrate 1 is rotating clockwise as indicated by an arrow, the origin detection circuit 203c detects a decrease in the detected amount of light and outputs it as the origin signal.

In the present specification, the position of the edge 2h of the cap 2 is treated as the position of the origin of the sample analysis substrate 1 (the reference angular position of the sample analysis substrate 1). Note however that a particular angular position that is arbitrarily determined based on the position of the edge 2j of the cap 2 may be determined as the origin. Where the cap 2 has a sector shape and the center angle thereof is smaller than the angular detection accuracy that is needed for sample analysis, the cap 2 itself may be determined as the origin position.

The origin position is used for the sample analyzer 200 to obtain information of the rotation angle of the sample analysis substrate 1. The origin detector 203 may include other components. For example, the sample analysis substrate 1 may include a magnet for origin detection, and the origin detector 203 may be a magnet detection element for detecting the magnetism of this magnet. The magnet for capturing magnetic particles to be described below may be used for origin detection.

The optical measurement unit 207 detects a signal that corresponds to the specimen held on the sample analysis substrate 1. The signal is the absorbance, or the like, for light such as fluorescence emitted from the specimen that has reacted with a reagent or for light having passed through the specimen. For example, the optical measurement unit 207 includes a light source 207a, a photodetector 207b and a detection circuit 207c, and the photodetector 207b detects the fluorescence emitted from the specimen that has reacted with the reagent by the light emitted from the light source 207a. The output from the photodetector 207b is input to the detection circuit 207c.

The control circuit 205 includes a CPU provided in the sample analyzer 200, for example. Based on the operator's command from the input device 209, the control circuit 205 actuates various parts of the sample analyzer 200 to analyze the specimen. Specifically, the control circuit 205 executes a computer program loaded onto the RAM (Random Access Memory; not shown), thereby sending instructions to other circuits in accordance with the procedure of the computer program. Circuits receiving instructions operate as described in the present specification, thereby implementing the functions of the circuits. Instructions from the control circuit 205 are sent to the origin detector 203, the rotation angle detection circuit 204, the drive circuit 206, the optical measurement unit 207, etc.

Note that the RAM loaded with a computer program, in other words, the RAM storing a computer program, may be volatile or non-volatile. A volatile RAM is a RAM that cannot retain information stored thereon unless it is receiving power supply. For example, a dynamic random access memory (DRAM) is a typical volatile RAM. A non-volatile RAM is a RAM that can retain information without power supply thereto. For example, a magnetoresistance RAM (MRAM), a resistive RAM (ReRAM) and a ferroelectric memory (FeRAM) are example non-volatile RAMs. In the present embodiment, a non-volatile RAM is preferably employed.

A volatile RAM and a non-volatile RAM are both examples of non-transitory computer-readable recording media. A magnetic recording medium such as a hard disk and an optical recording medium such as an optical disc are also examples of non-transitory computer-readable recording media. That is, the computer program of the present disclosure may be recorded on any of various non-transitory computer-readable media, other than media (transitory media) such as the air capable of propagating the computer program as a radio signal.

In the present specification, the control circuit 205 is described as a separate component from the rotation angle detection circuit 204 and the origin detection circuit 203c of the origin detector 203. However, these components may be implemented by shared hardware. For example, a CPU (computer) provided in the sample analyzer 200 may execute, in series or in parallel, a computer program that serves as the control circuit 205, a computer program that serves as the rotation angle detection circuit 204 and a computer program that serves as the origin detection circuit 203c of the origin detector 203. Then, the CPU can apparently operate as different components.

The structure of the sample analysis substrate of the present embodiment will be described in detail. With the sample analysis substrate, a liquid that has been introduced in the sample analysis substrate 1 is transferred through rotary motion. As will be described in detail below, the sample analysis substrate of the present embodiment includes two containers each holding a liquid. FIG. 2A shows an exploded perspective view of the sample analysis substrate 1. In the present embodiment, the sample analysis substrate 1 includes a base substrate 3, a cover substrate 4, the cap 2, a first container 5 and a second container 105. The base substrate 3 and the cover substrate 4 together form a substrate body, and the substrate body and the cap 2 together form a substrate having the rotation axis A as a whole. The first container 5 and the second container 105 hold a first liquid and a second liquid, respectively. The first liquid and the second liquid may each be any of various liquids used for detecting a particular component in the specimen as described above, e.g., a substrate solution for light emission and a washing solution.

The base substrate 3 has a first surface 3a and a second surface 3b, and a microchannel structure 3c is formed on the first surface 3a. The microchannel structure 3c includes a plurality of chambers each holding a minute amount of a fluid, and a plurality of channels for moving fluids between the plurality of chambers.

Further provided on the first surface 3a of the base substrate 3 are a first accommodating section 11 for accommodating the first container 5 and a second accommodating section 111 for accommodating the second container 105. Seal-breaking nails 14 and 114, which are projections, are provided in the space of the first accommodating section 11 accommodating the first container 5 and in the space of the second accommodating section 111 accommodating the second container 105, respectively. The first accommodating section 11 and the second accommodating section 111 are located in the vicinity of the rotation axis A of the substrate body.

The base substrate 3 has a disc shape having a cut-out portion 3n, and further includes an injection port 13 that protrudes from the cut-out portion 3n. The injection port 13 is an opening for introducing a sample liquid including the specimen into the microchannel structure 3c.

The cover substrate 4 is attached to the base substrate 3 so that the first surface 3a of the base substrate 3 opposes and contacts a second surface 4b of the cover substrate 4. This closes the opening of the first surface 3a of the microchannel structure 3c of the base substrate 3, thereby forming a plurality of partitioned chambers and a plurality of channels in the substrate that is composed of the base substrate 3, the cover substrate 4 and the cap 2. Provided on a first surface 4a of the cover substrate 4 is a rotational support portion 15 that is inserted into the turntable 202.

Figure 3A:
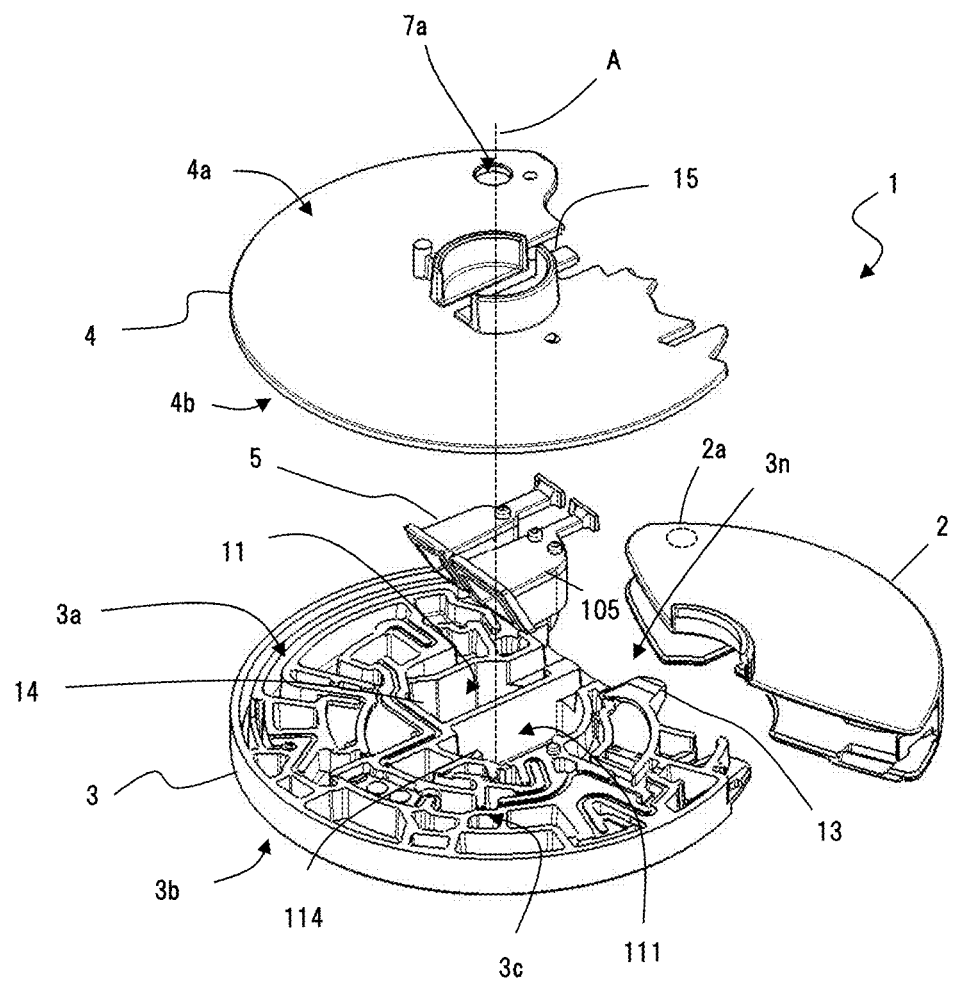
FIG. 3A is an exploded perspective view of the sample analysis substrate.
Figure 3B:
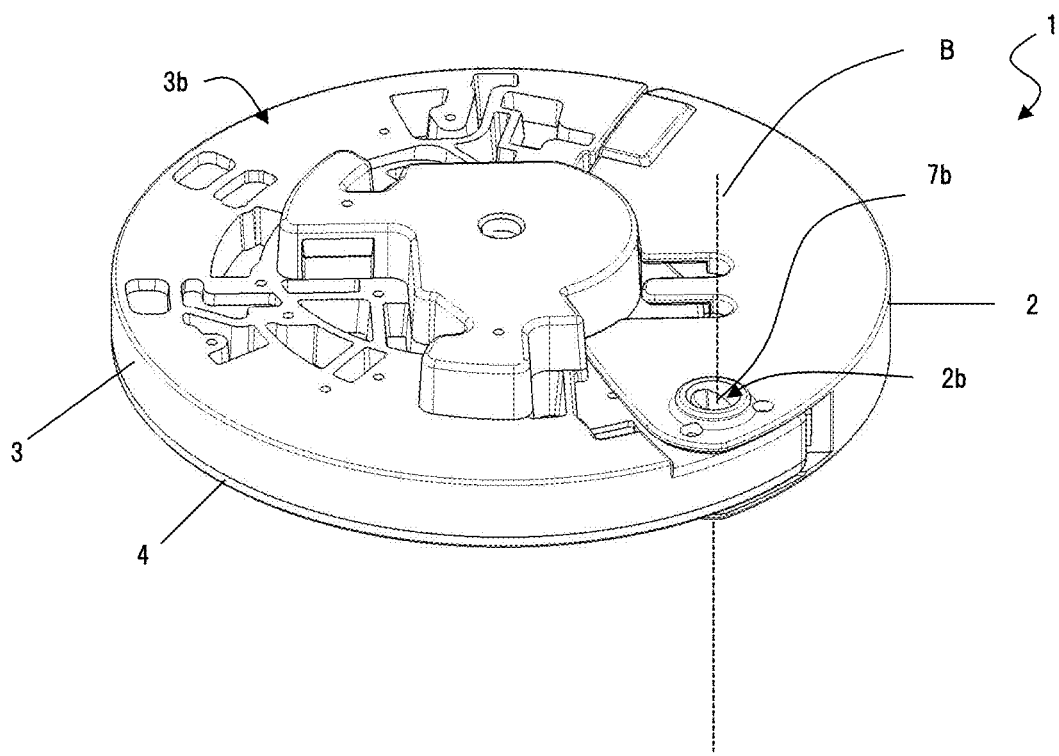
FIG. 3B is a perspective view of the sample analysis substrate with the cap closed.
Figure 3C:
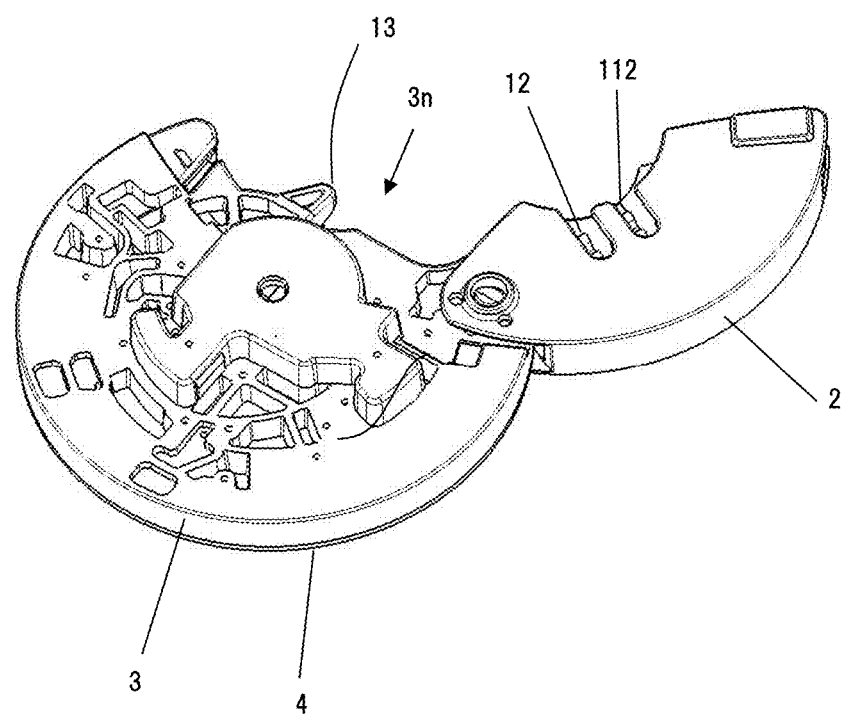
FIG. 3C is a perspective view of the sample analysis substrate with the cap open.

FIG. 3B and FIG. 3C are perspective views of the sample analysis substrate 1, with the cap 2 closed and open, respectively. The cap 2 has a sector shape that covers the cut-out portion 3n of the base substrate 3, and has a hole 2a and a protrusion 2b at one end of the sector shape. A protrusion 7a and a depression 7b are provided in the vicinity of the cut-out portion 3n on the first surface 4a of the cover substrate 4 and the second surface 3b of the base substrate 3, respectively, and the protrusion 7a and the depression 7b are inserted into the hole 2a and over the protrusion 2b of the cap 2. Thus, the cap 2 is pivotally supported on the substrate body with the center of the protrusion 7a and the depression 7b being the pivot axis B.

As shown in FIG. 3C, with the cap 2 open, the injection port 13 is exposed, and a specimen liquid can be introduced through the injection port 13. As shown in FIG. 3B, with the cap 2 closed, the injection port 13 is covered by the cap 2. Thus, when a sample liquid is introduced through the injection port 13 and the sample analysis substrate 1 is rotated, this prevents the sample liquid from spilling out through the injection port 13.

The cap 2 also serves to move the first container 5 held in the first holding position of the first accommodating section 11 before measurement and the second container 105 held in the second holding position of the second accommodating section 111 before measurement to the first release position and the second release position, respectively, at the time of measurement, thereby cutting open the first container 5 and the second container 105. The structures of the cap 2, and the first container 5 and the second container 105 will be described in detail while their functions will be described.

Figure 4A:
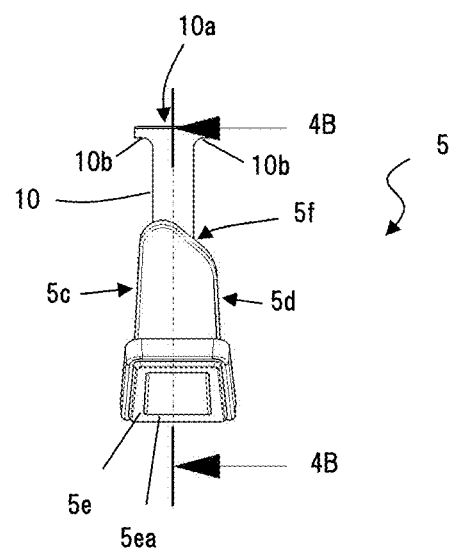
FIG. 4A is a plan view of a first container.
Figure 4B:
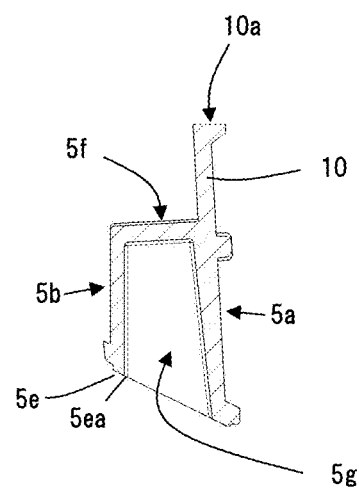
FIG. 4B is a cross-sectional view of the first container taken along line 4B-4B of FIG. 4A.
Figure 4C:
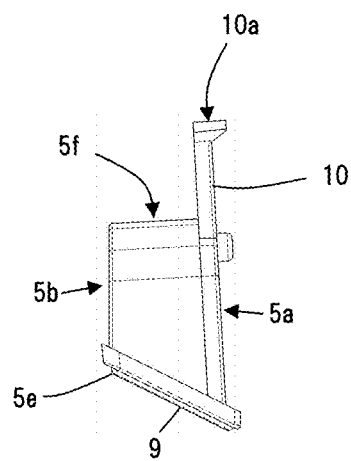
FIG. 4C is a side view of the first container.
Figure 4D:
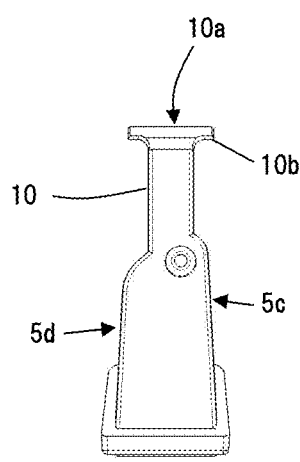
FIG. 4D is a back view of the first container.
Figure 4E:
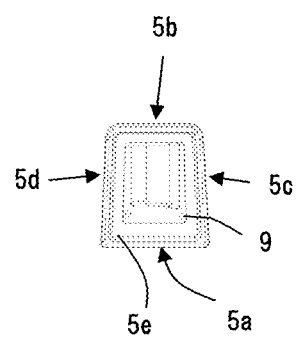
FIG. 4E is a front view of the first container.
Figure 5A:
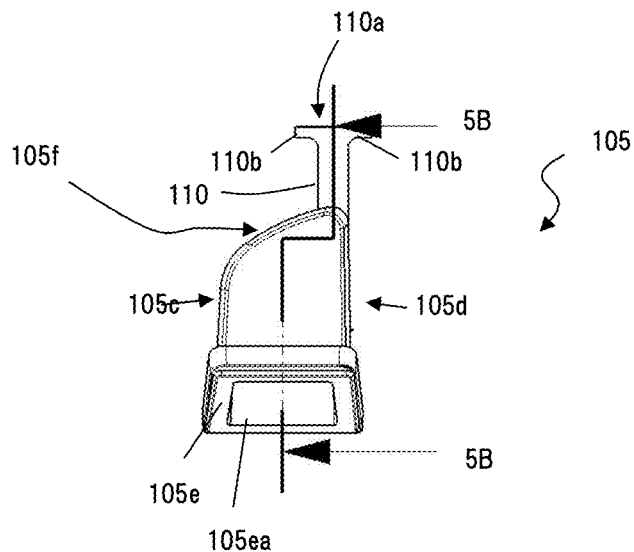
FIG. 5A is a plan view of the second container.
Figure 5B:
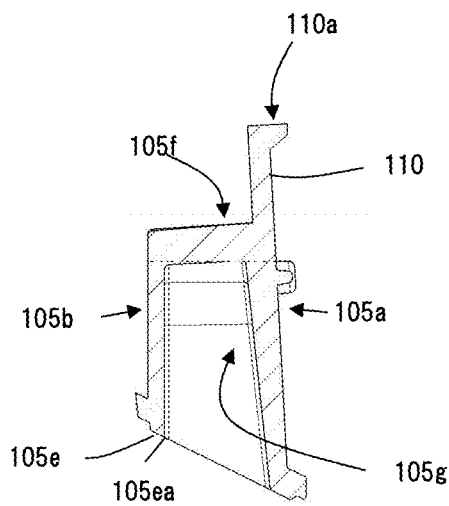
FIG. 5B is a cross-sectional view of the second container taken along line 5B-5B of FIG. 5A.
Figure 5C:
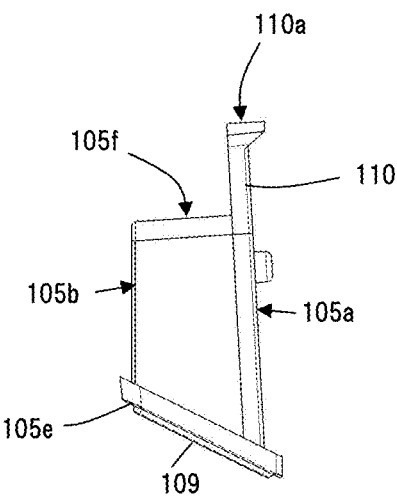
FIG. 5C is a side view of the second container.
Figure 5D:
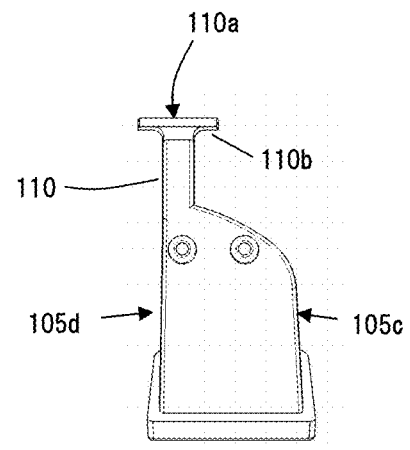
FIG. 5D is a back view of the second container.
Figure 5E:
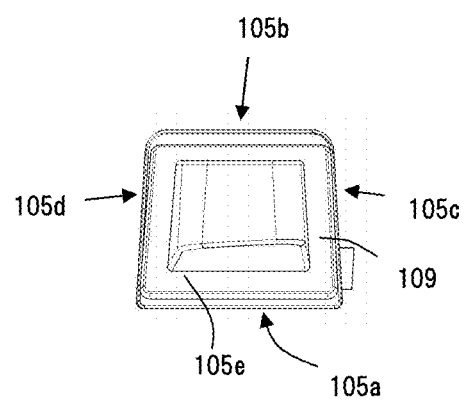
FIG. 5E is a front view of the second container.
Figure 6A:
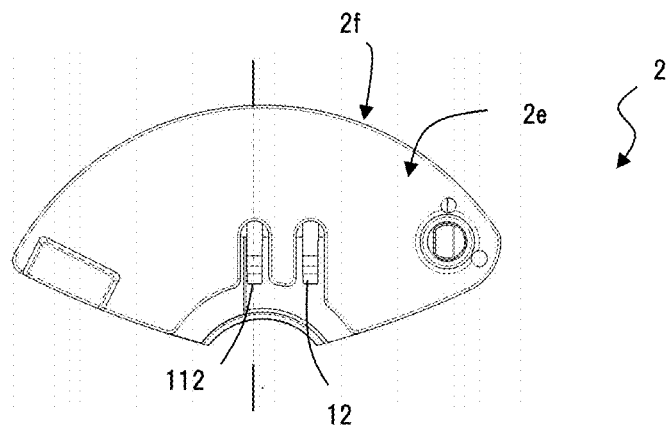
FIG. 6A is a plan view of the cap.
Figure 6B:
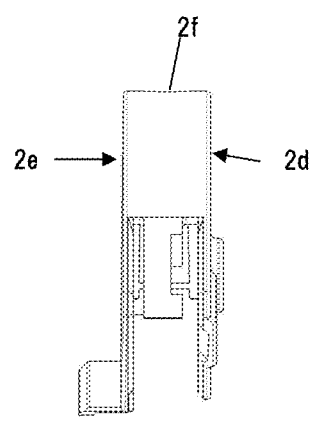
FIG. 6B is a side view of the cap.
Figure 6C:
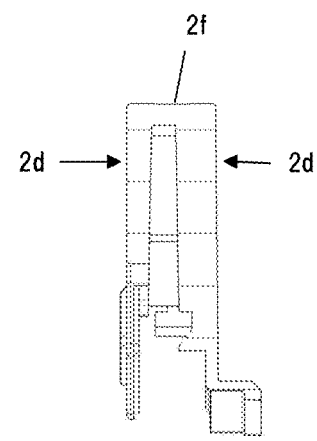
FIG. 6C is a cross-sectional view of the cap taken along line 6C-6C of FIG. 6A.
Figure 6D:
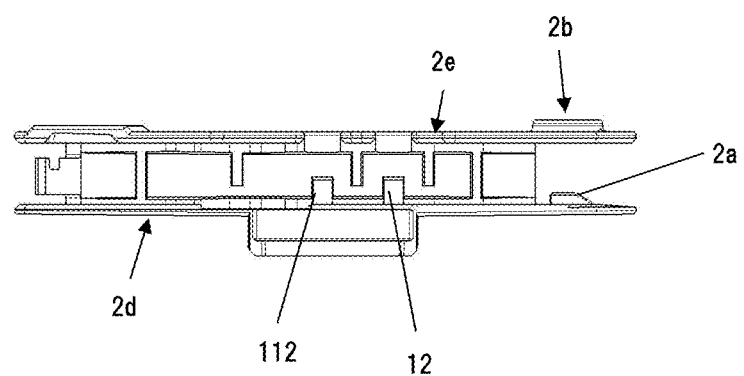
FIG. 6D is a back view of the cap 2.

FIG. 4A to FIG. 4E are a plan view of the first container 5, a cross-sectional view of FIG. 4A taken along line 4B-4B, a side view thereof, a back view thereof, and a front view thereof. FIG. 5A to FIG. 5E are a plan view of the second container 105, a cross-sectional view of FIG. 5A taken along line 5B-5B, a side view thereof, a back view thereof, and a front view thereof. FIG. 6A to FIG. 6D are a plan view of the cap 2, a side view thereof, a cross-sectional view of FIG. 6A taken along line 6C-6C, and a back view thereof.

The first container 5 has a first surface 5a, a second surface 5b, side surfaces 5c, 5d and 5e located between the first surface 5a and the second surface 5b, and a space 5g surrounded by these surfaces. The side surface 5c and the side surface 5d are located on opposite sides from each other, and the side surface 5e and a side surface 5f are located on opposite sides from each other. An opening 5ea is provided on the side surface 5e. The side surface 5e is inclined toward the second surface 5b. That is, on the cross section shown in FIG. 4B, the angle formed between the first surface 5a and the side surface 5e is smaller than 90°. A first liquid is held in the space 5g, and a sealing membrane 9 is attached to the side surface 5e so as to cover the opening 5ea. For example, the sealing membrane is made of a resin, an aluminum foil or a composite member thereof, etc.

A first pusher portion 10 is provided on the side surface 5f. The first pusher portion 10 has a longitudinal direction, and one end thereof in the longitudinal direction is connected to the side surface 5f. A first contact surface 10a is provided at the other end of the first pusher portion 10. A flange portion 10b is provided around the first contact surface 10a. As will be described below, the flange portion 10b is capable of elastic deformation.

The second container 105 also has a similar structure to that of the first container 5. Specifically, the second container 105 has a first surface 105a, a second surface 105b, side surfaces 105c, 105d and 105e located between the first surface 105a and the second surface 105b, and a space 105g surrounded by these surfaces. In the present embodiment, the space 105g of the second container 105 is larger than the space 5g of the first container 5. However, the space 5g of the first container 5 may be larger than the space 105g of the second container 105, or the space 5g and the space 105g may be of the same size. The size of the space 5g and the size of the space 105g depend on the amount of the first liquid and the amount of the second liquid accommodated therein that are needed when detecting a particular component in the specimen by using the sample analysis substrate 1.

The side surface 105c and the side surface 105d are located on opposite sides from each other, and the side surface 105e and a side surface 105f are located on opposite sides from each other. An opening 105ea is provided on the side surface 105e. The side surface 105e is inclined toward the second surface 105b. That is, on the cross section shown in FIG. 4B, the angle formed between the first surface 105a and the side surface 105e is smaller than 90°. A second liquid is held in the space 105g, and a sealing membrane 109 is attached to the side surface 105e so as to cover the opening 105ea. For example, the sealing membrane is made of a resin, an aluminum foil or a composite member thereof, etc.

A second pusher portion 110 is provided on the side surface 105f. The second pusher portion 110 has a longitudinal direction, and one end thereof in the longitudinal direction is connected to the side surface 105f. A second contact surface 110a is provided at the other end of the second pusher portion 110. A flange portion 110b is provided around the second contact surface 110a. As will be described below, the flange portion 110b is capable of elastic deformation or plastic deformation.

The cap 2 has a first surface 2d and a second surface 2e having a generally sector shape, and an arc-shaped side surface 2f located between the first surface 2d and the second surface 2e. A first drive projection 12 and a second drive projection 112 are located on the inner side of the first surface 2d.

Figure 7A:
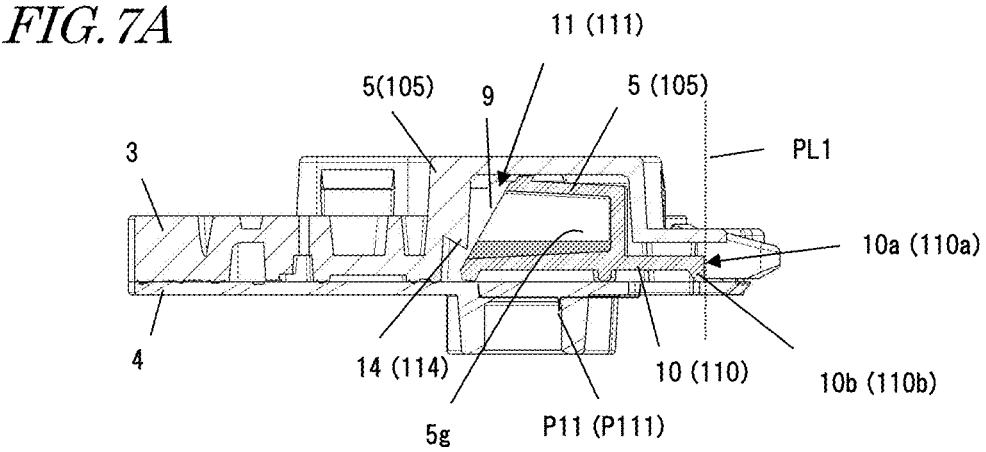
FIG. 7A is a cross-sectional view showing the sample analysis substrate before use.
Figure 7B:
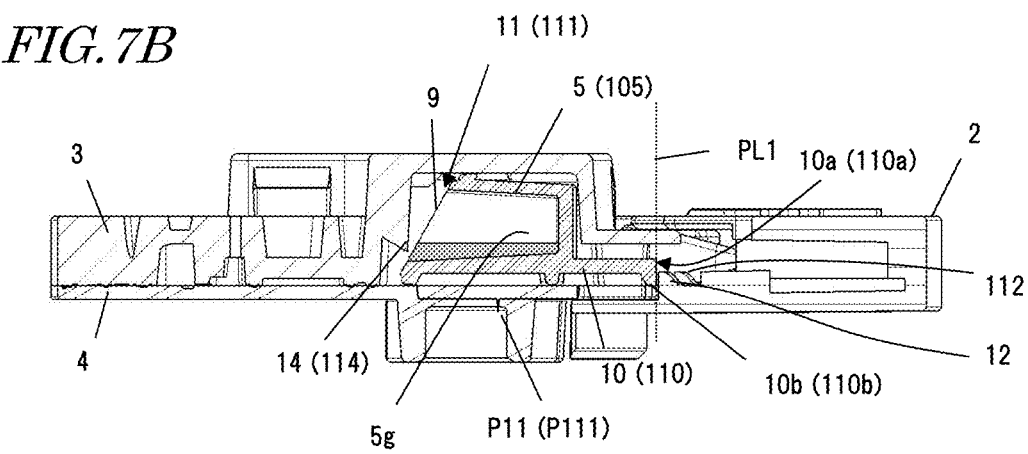
FIG. 7B is a cross-sectional view showing the sample analysis substrate with the cap being closed.
Figure 7C:
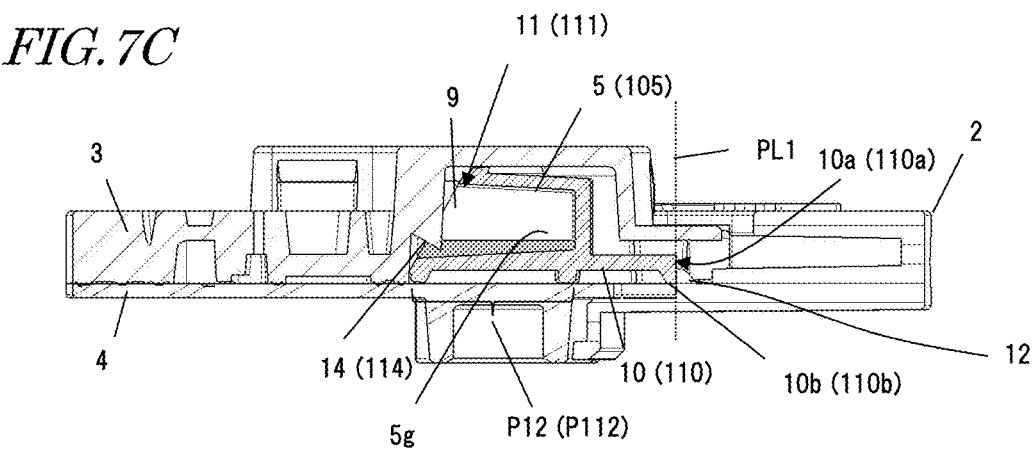
FIG. 7C is a cross-sectional view showing the sample analysis substrate with the cap closed.

FIG. 7A to FIG. 7C are cross-sectional views showing a state before the sample analysis substrate 1 is used, a state where the specimen has been introduced into the sample analysis substrate 1 through the injection port 13 with the cap 2 being closed, and a state where the cap 2 is closed, respectively. For the sake of simplicity, the cap 2 is not shown in FIG. 7A. As shown in FIG. 7A, in the state before use, the first container 5 is located in the first holding position P11 in the first accommodating section 11. In this position, the flange portion 10b of the first pusher portion 10 is in engagement with a portion of the wall of the base substrate 3 that defines the first accommodating section 11, and as the inner wall on the radially outer side of the first accommodating section 11 and the first container 5 come into contact with each other, the first container 5 is held in the first holding position P11, which is a position on the radially most outer side, in the space of the first accommodating section 11. At this point, the sealing membrane 9 of the first container 5 has not been penetrated by the seal-breaking nail 14, and the space 5g of the first container 5 remains sealed. The first contact surface 10a of the first pusher portion 10 is located on the first plane PL1, which is perpendicular to the direction of movement of the first container 5 and a second container 115.

As the cap 2 is pivoted in the closing direction from this state, the first drive projection 12 comes into contact with the first contact surface 10a of the first pusher portion 10 of the first container 5 as shown in FIG. 7B. At this point, the first container 5 is located in the first holding position P11. As will be described below, the second drive projection 112 has not reached the first plane PL1 at this point.

As the cap 2 is pivoted further, as shown in FIG. 7C, the first drive projection 12 drives the first container 5 toward the rotation axis A while being in contact with the first contact surface 10a of the first pusher portion 10 of the first container 5. Thus, the flange portion 10b of the first pusher portion 10, which is in engagement with a portion of the wall of the base substrate 3 that defines the first accommodating section 11, elastically deforms or plastically deforms to go over the wall, thereby allowing the entire first container 5 to move. As a result, the first container 5 moves from the first holding position P11 to the first release position P12. In this process, the seal-breaking nail 14 penetrates through the sealing membrane 9 of the first container 5, thereby cutting open the first container 5 and forming an opening in the sealing membrane 9. Thus, the first liquid inside can be discharged to the outside of the first container 5 through the opening. In this state, a portion of the first liquid may be discharged from the first container 5 and located in the first accommodating section 11.

Also with the second container 105, as with the first container 5, as the cap 2 pivots, the second drive projection 112 is driven by contacting the first contact surface 10a of the first pusher portion 10 of the first container 5, and the flange portion 110b of the second pusher portion 110 elastically deforms or plastically deforms to move from the second holding position P111 to second release position. As a result, the seal-breaking nail 114 penetrates through the sealing membrane 109 of the second container 105, thereby cutting open the second container 105 and forming an opening in the sealing membrane 109.

When the cap 2 pivots, the cap 2 elastically deforms or plastically deforms the flange portion 10b of the first pusher portion 10 and the flange portion 110b of the second pusher portion 110, thereby moving the first container 5 and the second container 105. When deforming these two flange portions 10b and 110b simultaneously, there is a need to pivot the cap 2 with a large force, and the operator may possibly feel it difficult to close the cap 2. For this, the sample analysis substrate 1 of the present disclosure employs a structure such that the two flange portions 10b and 110b deform with staggered timing. The structure will now be described.

Figure 8A:
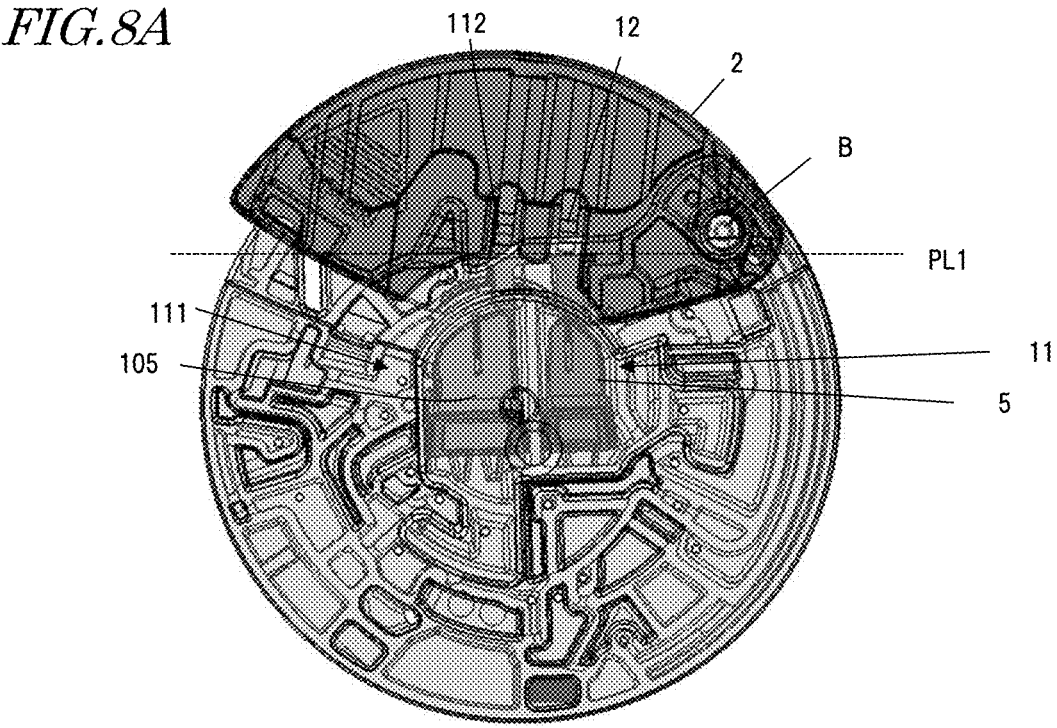
FIG. 8A is a view illustrating a point in time where the first container and the second container are being driven by the cap in the sample analysis substrate.
Figure 8B:
FIG. 8B is an enlarged view showing a part of FIG. 8A.
Figure 9A:
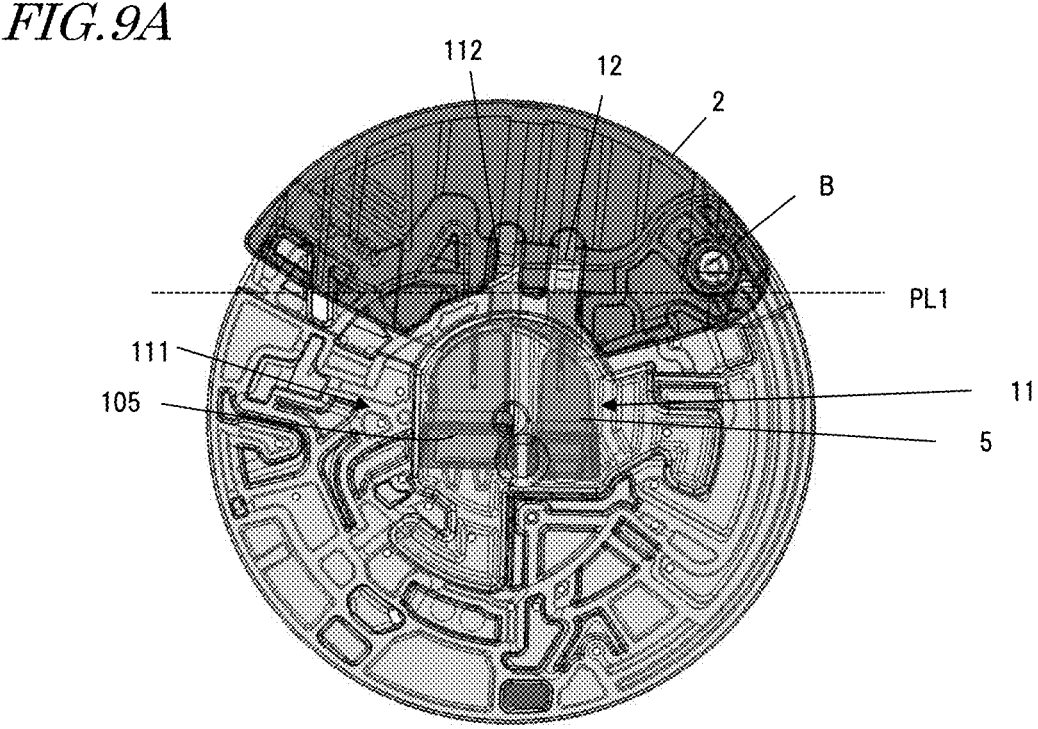
FIG. 9A is a view illustrating a point in time where the first container and the second container are being driven by the cap in the sample analysis substrate.
Figure 9B:
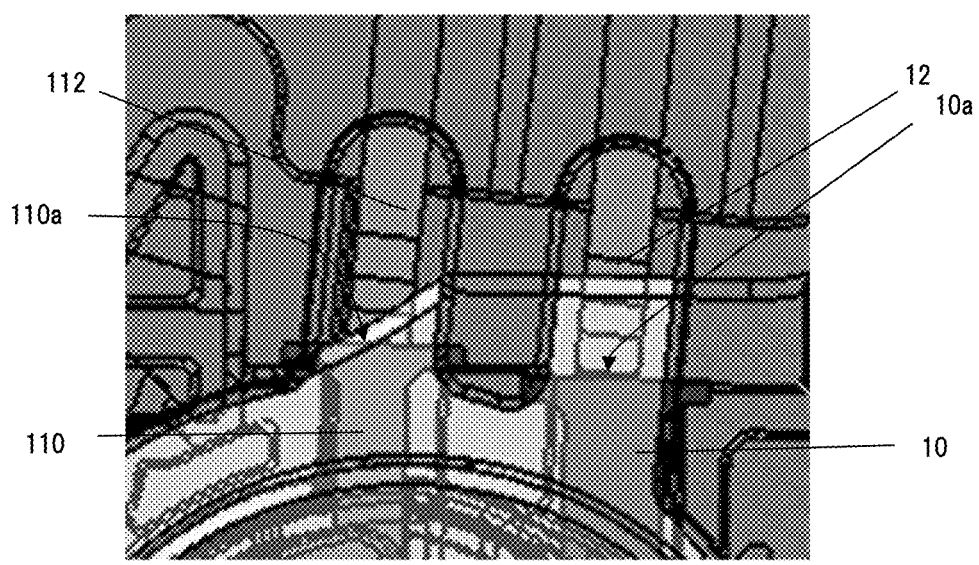
FIG. 9B is an enlarged view showing a part of FIG. 9A.
Figure 10A:
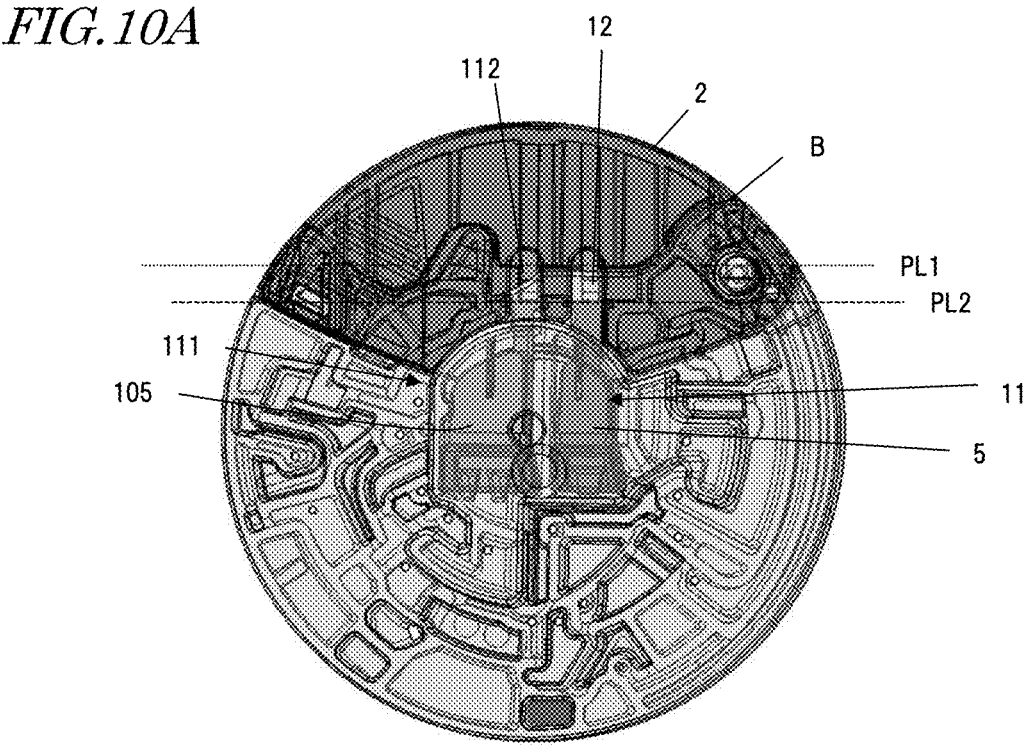
FIG. 10A is a view illustrating a point in time where the first container and the second container are being driven by the cap in the sample analysis substrate.
Figure 10B:
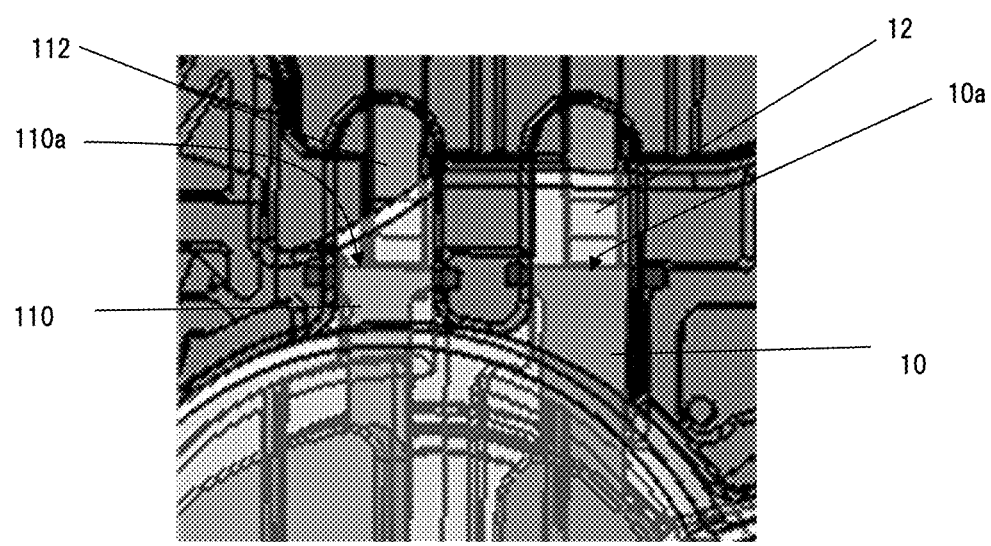
FIG. 10B is an enlarged view showing a part of FIG. 10A.

FIG. 8A, FIG. 9A and FIG. 10A show a state where the cap 2 of the sample analysis substrate 1 starts to be closed, a state where the cap 2 is being closed, and a state where the cap 2 is completely closed, respectively. FIG. 8B, FIG. 9B and FIG. 10B are partial enlarged views of FIG. 8A, FIG. 9A and FIG. 10A, respectively.

As shown in FIG. 8A, in a state where the cap 2 of the sample analysis substrate 1 starts to be closed, the first container 5 and the second container 105 are in the first holding position P11 and the second holding position P111, respectively. The first contact surface 10a of the first pusher portion 10 of the first container 5 and the second contact surface 110a of the second pusher portion 110 of the second container 105 are located on the first plane PL1, which is perpendicular to the direction of movement of the first container 5 and the second container 105. As the cap 2 is pivoted so as to close the cap 2 to reach the first position, first, the first drive projection 12 comes into contact with the first contact surface 10a. At this point, the second drive projection 112 is not in contact with the second contact surface 110a and is spaced apart from the second contact surface 110a. This is because the pivot axis B is located on the side of the first drive projection 12, i.e., the distance between the pivot axis B and the tip of the second drive projection 112 is longer than the distance between the pivot axis B and the tip of the first drive projection 12.

As the cap is further rotated in this state, the first drive projection 12 elastically deforms or plastically deforms the flange portion 10b of the first pusher portion 10, thereby moving the first container 5, as described above. At this point, since the second drive projection 112 is spaced apart from the second contact surface 110a, just the force for elastically deforming or plastically deforming only the flange portion 10b is required as the force for pivoting. Thus, there is no need for a large force.

As the cap 2 is further rotated, the elastic deformation or plastic deformation of the flange portion 10b of the first pusher portion 10 is completed, and the first container 5 starts moving. Accordingly, the seal-breaking nail 14 penetrates through the sealing membrane 9 of the first container 5, thereby cutting open the first container 5.

As shown in FIG. 10A and FIG. 10B, as the cap 2 is pivoted to reach the second position, the second drive projection 112 comes into contact with the second contact surface 110a. At this point, the first container 5 is located between the first holding position P11 and the first release position P12. Thereafter, the second drive projection 112 elastically deforms or plastically deforms the flange portion 110b of the second pusher portion 110, thereby moving the second container 105. In this process, the first drive projection 12 drives the first container 5 while being in contact with the first contact surface 10a, but it does not elastically deform or plastically deform the flange portion 10b of the first pusher portion 10. Therefore, just the force for elastically deforming or plastically deforming only the flange portion 110b is required as the force for pivoting. Thus, there is no need for a large force. As the cap 2 is further rotated, the elastically deformation or plastically deformation of the flange portion 110b of the second pusher portion 110 is completed, and the second container 105 starts moving. Accordingly, the seal-breaking nail 114 penetrates through the sealing membrane 109 of the second container 105, thereby cutting open the second container 105.

As shown in FIG. 10A and FIG. 10B, as the cap 2 is further rotated to reach the third position, the cap 2 is closed. At this point, the first container 5 and the second container 105 are moved to the first release position P12 and the second release position P112. In this state, the tip of the first drive projection 12 and the tip of the second drive projection 112 are located on the second plane PL2 parallel to the first plane PL1.

Figure 11:
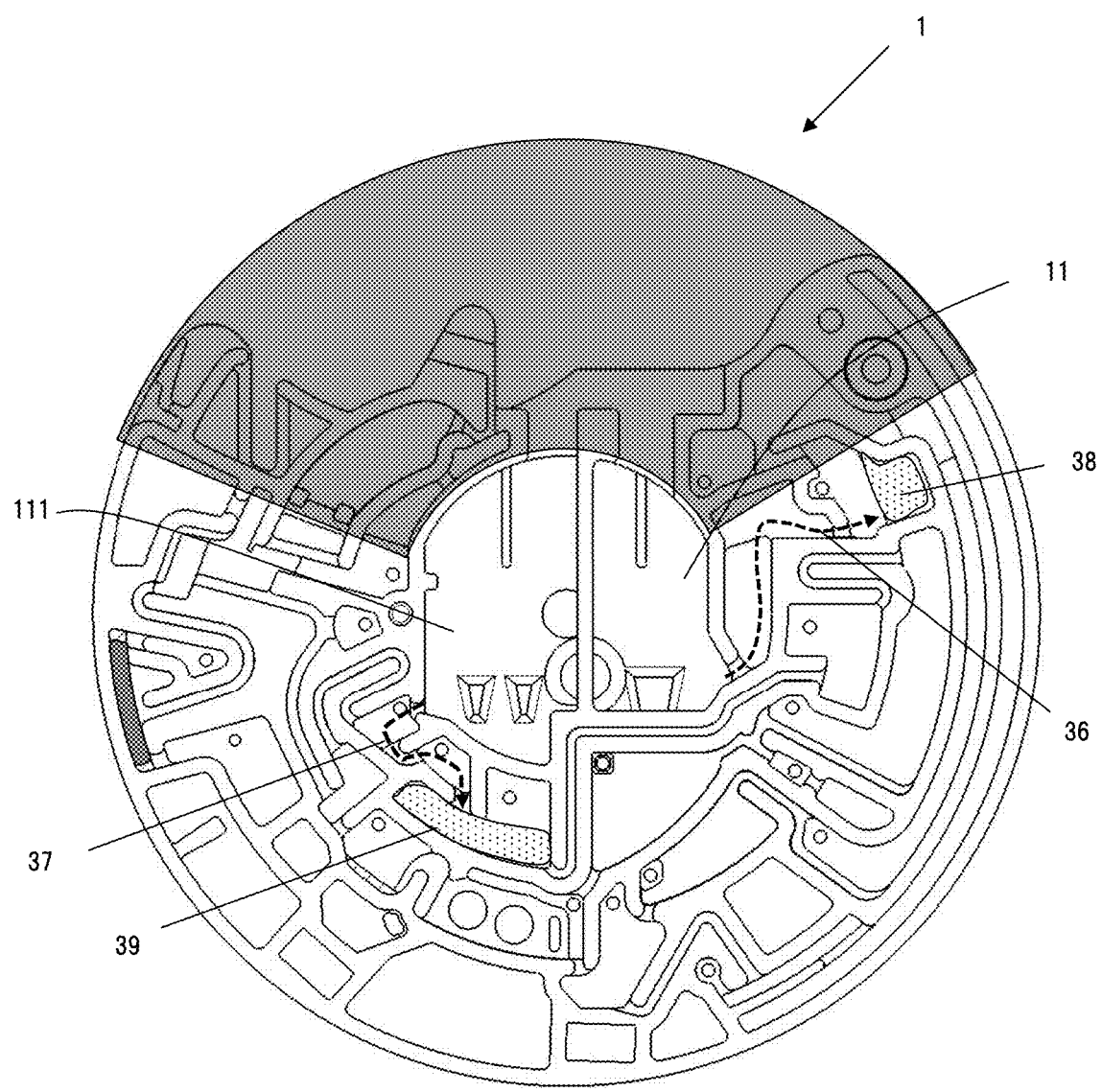
FIG. 11 is a schematic view illustrating the movement in the sample analysis substrate of the liquids discharged from the first container and the second container.

As shown in FIG. 11, with the first container 5 and the second container 105 cut open, as the sample analysis substrate 1 is set on the turntable 202 of the sample analyzer 200 and the sample analysis substrate 1 is rotated, the first solution and the second solution are discharged through the opening of the first container 5 and the opening of the second container 105, respectively, into the first accommodating section 11 and the second accommodating section 111 due to centrifugal force, and are further transferred to a first holding chamber 38 and a second holding chamber 39 via passages 36 and 37.

Thus, the sample analysis substrate of the present disclosure holds therein a plurality of liquids, and when analyzing the specimen, the cover is closed, thereby cutting open the containers holding the liquids so that the liquids can be discharged from the containers. In this process, there is no need for a large force, thus achieving a desirable operability.

The microchannel structure 3c formed in the sample analysis substrate 1 can be configured as a combination of various channels and chambers as described above depending on the state of the specimen to be introduced, the particular component in the specimen to be analyzed, the method for detecting the particular component, etc. Where one or more of the various liquids in the sample analysis substrate 1, such as the specimen to be introduced and the first liquid and the second liquid used for analyzing the specimen, is used while the other liquid or liquids is not used for analysis, and where the liquid or liquids that is not used can move unnecessarily together with the movement of the liquid or liquids that is needed for analysis, the liquid or liquids that is not used may be absorbed with an absorbent.

Figure 12A:
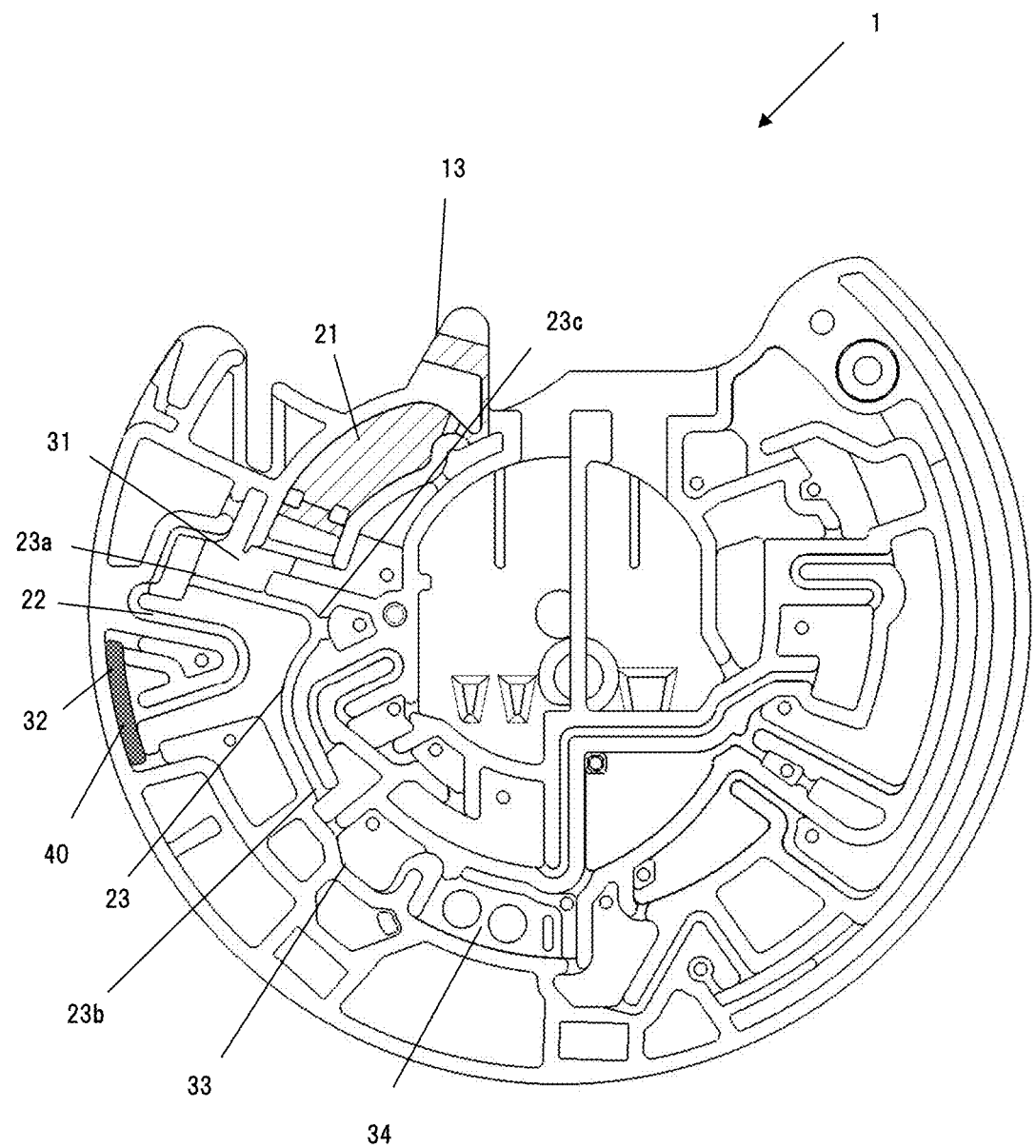
FIG. 12A is a schematic view illustrating the movement of a liquid in the sample analysis substrate.

For example, as shown in FIG. 12A, the sample analysis substrate 1 includes a specimen chamber 31, an overflow chamber 32, a holding chamber 33, a reagent chamber 34 and channels 21, 22 and 23. The channel 21 connects together the injection port 13 and the specimen chamber 31, and the channel 22 connects together the specimen chamber 31 and the overflow chamber 32. The channel 23 connects together the specimen chamber 31 and the holding chamber 33. The holding chamber 33 is connected to the reagent chamber 34. The channels 21, 22 and 23 are capillaries, for example. A portion of the reagent chamber 34 is composed of a capillary and is connected to the holding chamber 33. The cap 2 is not shown in FIG. 12A and subsequent figures for the sake of simplicity.

The sample analysis substrate 1 further includes an absorbent 40 that is arranged in the overflow chamber 32. The absorbent 40 is a material that is capable of absorbing and holding a liquid, e.g., a porous material such as a sponge, a filter paper, etc.

Figure 12B:
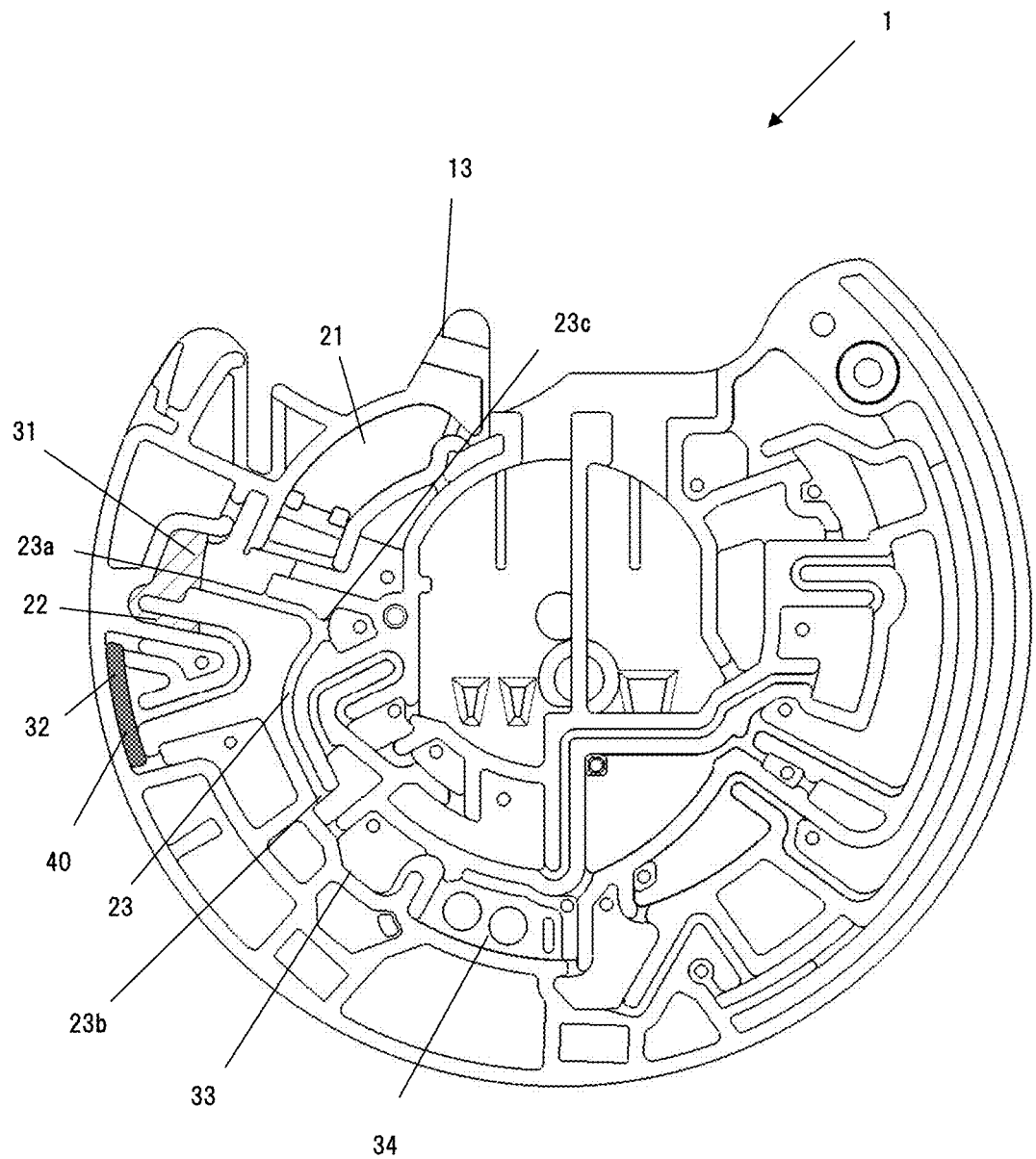
FIG. 12B is a schematic view illustrating the movement of a liquid in the sample analysis substrate.
Figure 12C:
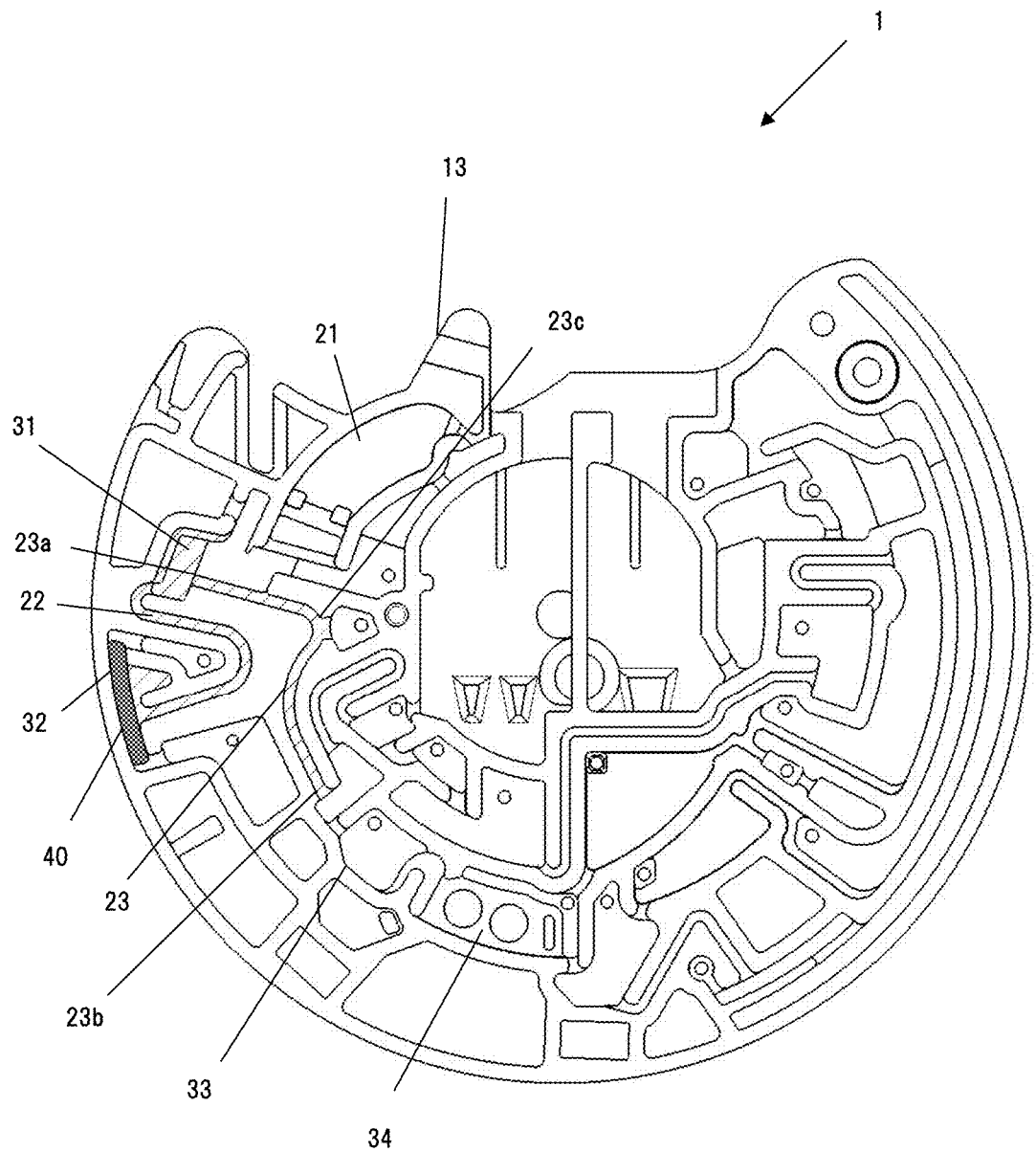
FIG. 12C is a schematic view illustrating the movement of a liquid in the sample analysis substrate.
Figure 12D:
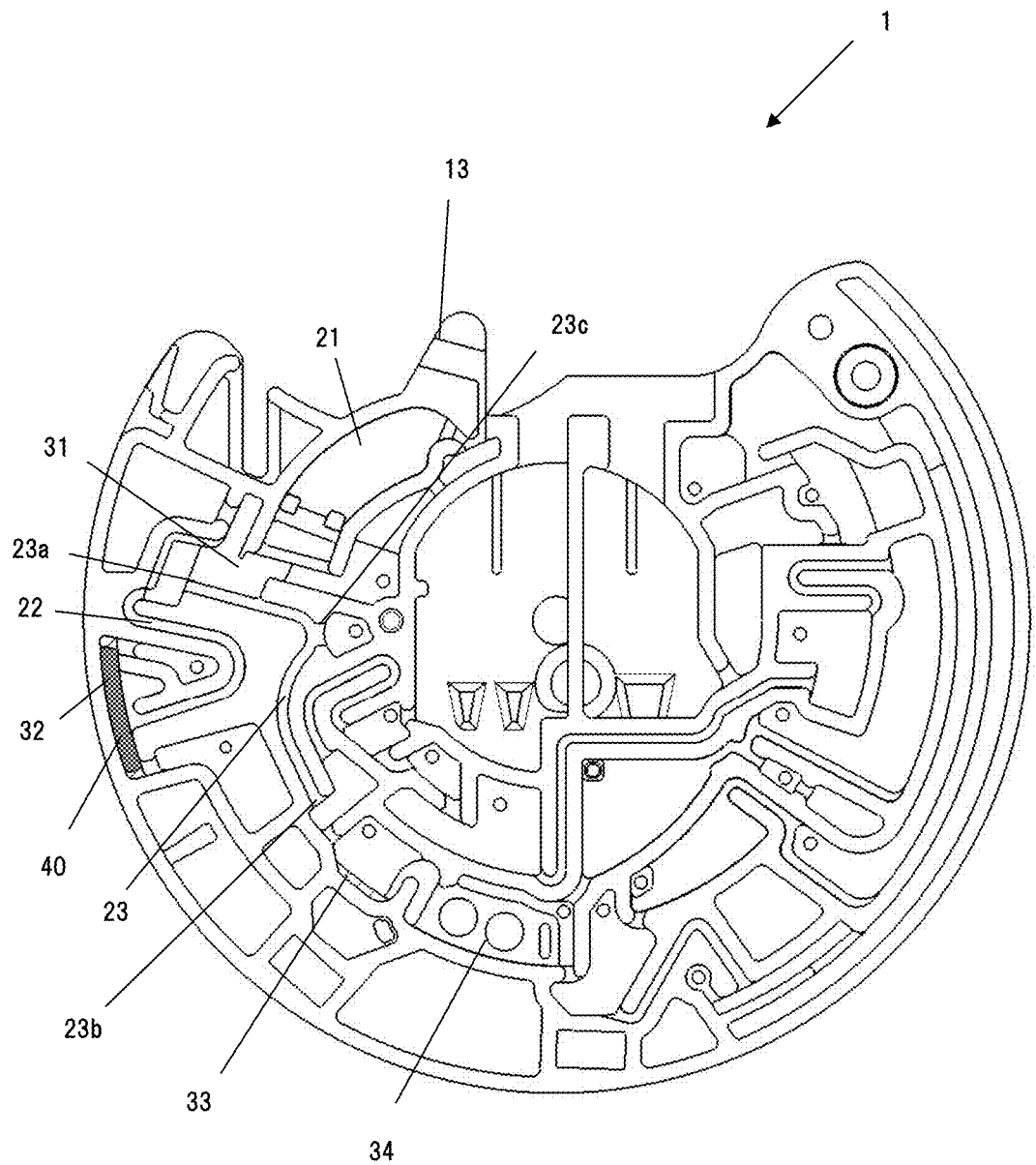
FIG. 12D is a schematic view illustrating the movement of a liquid in the sample analysis substrate.

As shown in FIG. 12A, when a specimen such as a blood plasma is introduced through the injection port 13, the introduced specimen is introduced into the channel 21 by capillary force. Thus, an amount of specimen is metered as defined by the capacity of the channel 21. Thereafter, as the sample analysis substrate 1 is rotated, the specimen in the channel 21 is moved by centrifugal force to the specimen chamber 31 as shown in FIG. 12B. As the rotation of the sample analysis substrate 1 is stopped, the channels 22 and 23 is filled with the specimen by capillary force as shown in FIG. 12C. Now, as the sample analysis substrate 1 is rotated, a part of the specimen filling the channel 23 that is located between a bend 23c, which is located on the rotation axis side relative to an inlet 23a and an outlet 23b of the channel 23 and which serves as the boundary, and the outlet 23b is transferred to the holding chamber 33 by centrifugal force as shown in FIG. 12D. On the other hand, the specimen that is located between the inlet 23a and the bend 23c in the channel 23 and the specimen that remains in the specimen chamber 31 are moved by centrifugal force to the overflow chamber 32 via the channel 22 to be absorbed by the absorbent 40.

Figure 12E:
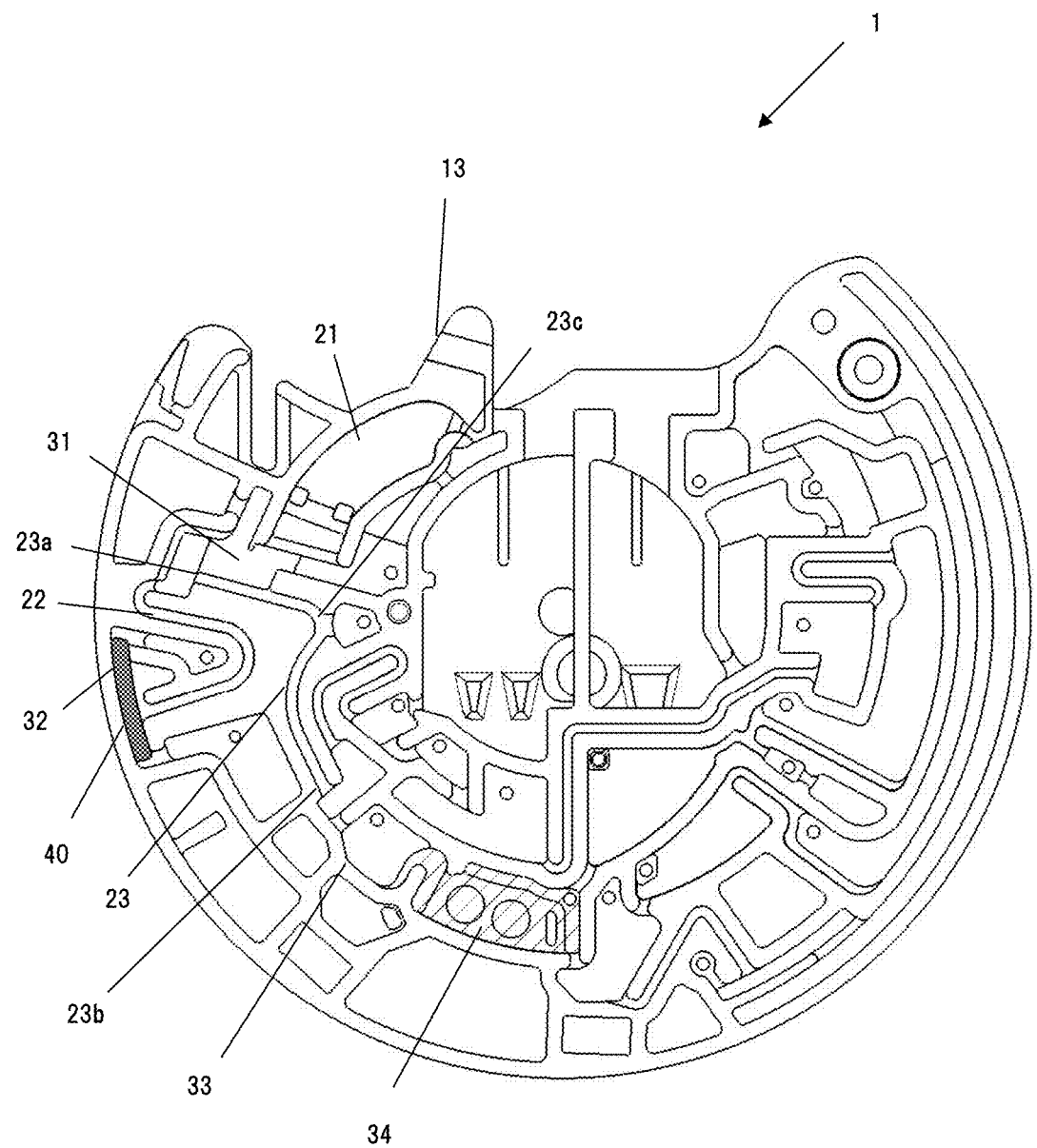
FIG. 12E is a schematic view illustrating the movement of a liquid in the sample analysis substrate.

As the rotation of the sample analysis substrate 1 is stopped, the specimen in the holding chamber 33 is transferred to the reagent chamber 34 as shown in FIG. 12E. Thereafter, irrespective of the angle at which the sample analysis substrate 1 is stopped, the specimen that is absorbed by the absorbent 40 in the overflow chamber 32 does not come into contact with the channel 22 as long as it is held by the absorbent 40, thus preventing the specimen from leaking to the channel 22 from the overflow chamber 32.

In contrast, in the absence of the absorbent 40, depending on the angle at which the sample analysis substrate 1 is stopped, the specimen in the overflow chamber 32 may possibly come into contact with the opening of the channel 22. Then, it may leak into the channel 22 through the opening by capillary force.

Various modifications can be made to the sample analysis substrate of the present embodiment. For example, while the cap 2 is supported on the substrate body by the pivot axis in the present embodiment, the cap 2 may be supported slidably on the substrate body. The positions and the shapes of the first drive projection 12 and the second drive projection 112 of the cap 2, the shapes and the sizes of the internal spaces of the first container 5 and the second container 105, the positions of the first accommodating section 11 and the second accommodating section 111, etc., are not limited to the illustrated embodiment. While the first container 5 is first cut open when closing the cap 2 in the present embodiment, the position of the pivot axis of the cap 2, the positions and the shapes of the first drive projection 12 and the second drive projection 112, the lengths in the longitudinal direction of the first pusher portion 10 and the second pusher portion 110, etc., may be changed so that the second container 105 is first cut open.

REFERENCE SIGNS LIST

1 Sample analysis substrate
2 Cap
2a Hole
2b Protrusion
2d, 3a, 4a, 5a, 105a First surface
2e, 3b, 4b, 5b, 105b Second surface
2f Side surface
2h, 2j Edge
3 Base substrate
3c Microchannel structure
3n Cut-out portion
4 Cover substrate
5 First container
5c to 5f, 105c to 105f Side surface
5ea, 105ea Opening
5g, 105g Space
7a Protrusion
7b Depression
9, 109 Sealing membrane
10 First pusher portion
10a First contact surface
10b, 110b Flange portion
11 First accommodating section
12 First drive projection
13 Injection port
14, 114 Seal-breaking nail
15 Rotational support portion
21 to 23 Channel
23a Inlet
23b Outlet
23c Bend
31 Specimen chamber
32 Overflow chamber
33 Holding chamber
34 Reagent chamber
36, 37 Passage
38 First holding chamber
39 Second holding chamber
40 Absorbent
105 Second container
110 Second pusher portion
110a Second contact surface
111 Second accommodating section
112 Second drive projection
115 Second container
200 Sample analyzer
201 Motor
202 Turntable
203 Origin detector
203a Light source
203b Light-receiving element
203c Origin detection circuit
204 Rotation angle detection circuit
205 Control circuit
206 Drive circuit
207 Optical measurement unit
207a Light source
207b Photodetector
207c Detection circuit
208 Display device
209 Input device
250 Casing
250c Housing
251 Door
252 Power switch
253 Clamper
302 Magnetic particle
304 Primary antibody
305 Magnetic particle immobilized antibody
306 Antigen
307 Label substance
308 Labeled antibody
310 Complex
501 Sample analysis system

The invention claimed is:

1. A sample analysis substrate having a microchannel structure for transferring a liquid through rotary motion, comprising:
 a substrate body having a rotation axis;
 a first container having a first contact surface and holding a first liquid therein;
 a second container having a second contact surface and holding a second liquid therein;
 a first accommodating section located in the substrate body and accommodating the first container in such a manner that the first container is movable between a first holding position in which the first container is held and a first release position in which the first liquid can be released from the first container;
 a second accommodating section located in the substrate body and accommodating the second container in such a manner that the second container is movable between a second holding position in which the second container is held and a second release position in which the second liquid can be released from the second container; and
 a cap having a first drive projection and a second drive projection and movably supported on the substrate body, wherein as the cap moves, the first drive projection and the second drive projection come into contact with the first contact surface and the second contact surface, respectively, thereby moving the first container and the second container from the first holding position and the second holding position to the first release position and the second release position,
 wherein the cap is capable of taking:
 a first position where the first container and the second container are in the first holding position and the second holding position, respectively, in which only the first drive projection is in contact with the first contact surface;
 a second position where the first container is located between the first holding position and the first release position and the second container is in the second holding position, in which the first drive projection and the second drive projection are in contact with the first contact surface and the second contact surface; and
 a third position where the first container and the second container are in the first release position and the second release position, respectively, in which the first drive projection and the second drive projection are in contact with the first contact surface and the second contact surface, respectively.

2. The sample analysis substrate according to claim 1, wherein:
   each of the first container and the second container holds the first liquid or the second liquid, and includes a space having an opening and a sealing membrane covering the opening;
   each of the first accommodating section and the second accommodating section includes a space accommodating the first container or the second container and a seal-breaking nail protruding into the space; and
   the seal-breaking nail does not penetrate through the sealing membrane when the first container and the second container are in the first holding position and the second holding position, and the seal-breaking nail penetrates through the sealing membrane when the first container and the second container are at least in the first release position and the second release position.

3. The sample analysis substrate according to claim 1, wherein:
   the first container includes a first pusher portion having the first contact surface, and the first pusher portion has an elastically deformable flange portion that is located around the second contact surface and in engagement with a portion of the substrate body; and
   the second container includes a second pusher portion having the second contact surface, and the second pusher portion has an elastically deformable flange portion that is located around the second contact surface and in engagement with a portion of the substrate body.

4. The sample analysis substrate according to claim 3, wherein:
   the first accommodating section and the second accommodating section are located in the vicinity of a rotation axis of the substrate body;
   when the first container and the second container are in the first holding position and the second holding position, respectively, the first contact surface and the second contact surface are located on a first plane that is perpendicular to a direction of movement of the first container and the second container;
   the cap is pivotally attached to the substrate body about a pivot axis that is located on a radially outer side relative to the first accommodating section and the second accommodating section and on a radially outer side relative to the first plane;
   a distance between the pivot axis and a tip of the second drive projection is longer than a distance between the pivot axis and a tip of the first drive projection; and
   when the cap is in the third position, the tip of the first drive projection and the tip of the second drive projection are located on a second plane that is parallel to the first plane.

5. The sample analysis substrate according to claim 1, further comprising:
   a first holding chamber for holding the first liquid, wherein the first holding chamber is located on a radially outer side relative to the first accommodating section in the substrate body;
   a passage that connects together the first holding chamber and the first accommodating section;
   a second holding chamber for holding the second liquid, wherein the second holding chamber is located on a radially outer side relative to the second accommodating section in the substrate body; and
   a passage that connects together the second holding chamber and the second accommodating section.

* * * * *